US012768934B2

(12) United States Patent
Harrebek et al.

(10) Patent No.: US 12,768,934 B2
(45) Date of Patent: Oct. 20, 2026

(54) TIMING ERROR GROUP REPORTING WITH ANGULAR VALIDITY INDICATION

(71) Applicant: Nokia Technologies Oy, Espoo (FI)

(72) Inventors: Johannes Harrebek, Aalborg (DK); Simon Svendsen, Aalborg (DK); Ryan Keating, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 276 days.

(21) Appl. No.: 18/695,623

(22) PCT Filed: Aug. 24, 2022

(86) PCT No.: PCT/EP2022/073581

§ 371 (c)(1),
(2) Date: Mar. 26, 2024

(87) PCT Pub. No.: WO2023/052007

PCT Pub. Date: Apr. 6, 2023

(65) Prior Publication Data

US 2025/0123352 A1 Apr. 17, 2025

Related U.S. Application Data

(60) Provisional application No. 63/250,698, filed on Sep. 30, 2021.

(51) Int. Cl.
*G01S 5/02* (2010.01)
*G01S 5/00* (2006.01)

(52) U.S. Cl.
CPC .......... *G01S 5/0244* (2020.05); *G01S 5/0018* (2013.01)

(58) Field of Classification Search
CPC .. H04B 7/0617; H04B 7/0628; H04B 7/0695; H04W 64/00; H04W 88/00; H04W 88/02;
(Continued)

(56) References Cited

U.S. PATENT DOCUMENTS

2017/0367073 A1* 12/2017 Murugan ................ H04L 5/001
2020/0154239 A1* 5/2020 Yamada ................ H04W 4/029
(Continued)

FOREIGN PATENT DOCUMENTS

WO 2022/069184 A1 4/2022
WO 2022/069793 A1 4/2022
WO 2022/263241 A1 12/2022

OTHER PUBLICATIONS

"New WID: NR Positioning Support", 3GPP TSG RAN Meeting #83, RP-190752, Agenda: 9.1.1, Intel Corporation, Mar. 18-21, 2019, 6 pages.
(Continued)

*Primary Examiner* — Young T. Tse
(74) *Attorney, Agent, or Firm* — Barta Jones, PLLC

(57) ABSTRACT

Systems, methods, apparatuses, and computer program products for TEG reporting with angular validity indication. One method may include a UE calculating an angular validity region around a reference direction for which at least one timing error group is valid, and transmitting at least one of the timing error groups comprising an indication about the angular validity region and a reference direction identifier associated with the reference direction to a location management node.

13 Claims, 25 Drawing Sheets

(58) Field of Classification Search
CPC ... H04W 88/08; H04W 88/085; G01S 5/0018; G01S 5/0027; G01S 5/0045; G01S 5/0054; G01S 5/0244
USPC ......... 370/228, 334; 375/260, 267; 455/440, 455/456.1, 456.5, 456.6
See application file for complete search history.

(56) References Cited

U.S. PATENT DOCUMENTS

| | | | | |
|---|---|---|---|---|
| 2021/0041522 | A1* | 2/2021 | Manolakos | G01S 1/0428 |
| 2021/0099965 | A1* | 4/2021 | Manolakos | G01S 13/878 |
| 2022/0322267 | A1* | 10/2022 | Bao | G01S 5/0036 |
| 2023/0095643 | A1 | 3/2023 | Svendsen et al. | |
| 2024/0057011 | A1* | 2/2024 | Fakoorian | G01S 5/0236 |

OTHER PUBLICATIONS

"Introduction of NR positioning support", 3GPP TSG-RAN WG1 Meeting #99, R1-1913661, Ericsson, Nov. 18-22, 2019, 10 pages.
"New SID on NR Positioning Enhancements", 3GPP TSG RAN Meeting #86, RP-193237, Agenda: 9.1.1, Qualcomm Incorporated, Dec. 9-12, 2019, 4 pages.
"Revised WID on NR Positioning Enhancements", 3GPP TSG RAN Meeting #91e, RP-210903, Agenda: 9.7.25, Intel Corporation, Mar. 16-26, 2022, 6 pages.
"Enhancements on Timing Error Mitigations for improved Accuracy", 3GPP TSG RAN WG1 #104b-e, R1-2103170, Agenda: 8.5.1, Qualcomm Incorporated, Apr. 12-20, 2021, pp. 1-19.
"Msc-generator", Sourceforge, Retrieved on Apr. 9, 2024, Webpage available at :https://sourceforge.net/projects/msc-generator/.
"3rd Generation Partnership Project; Technical Specification Group Radio Access Network; Study on channel model for frequencies from 0.5 to 100 GHz (Release 16)", 3GPP TR 38.901, V16.1.0, Dec. 2019, pp. 1-101.
"3rd Generation Partnership Project; Technical Specification Group Radio Access Network; LTE Positioning Protocol (LPP) (Release 16)", 3GPP TS 37.355, V16.6.0, Sep. 2021, pp. 1-299.
"3rd Generation Partnership Project; Technical Specification Group Radio Access Network; NR; Physical layer procedures for data (Release 16)", 3GPP TS 38.214, V16.7.0, Sep. 2021, pp. 1-172.
Invitation to Pay Additional Fees received for corresponding Patent Cooperation Treaty Application No. PCT/EP2022/073581, dated Dec. 16, 2022, 13 pages.
"Techniques mitigating Rx/Tx timing delays", 3GPP TSG-RAN WG1 Meeting #106-e, R1-2108164, Agenda: 8.5.1, Ericsson, Aug. 16-27, 2021, 24 pages.
"Email discussion summary for [100-e][237] NR_pos_enh_RRM_2", 3GPP TSG-RAN WG4 Meeting # 100-e, R4-2115412, Agenda: 9.21.2, CATT, Aug. 16-27, 2021, 38 pages.
"Views on mitigating UE and gNB Rx/Tx timing errors", 3GPP TSG RAN WG1 #106-e, R1-2107057, Agenda: 8.5.1, Nokia, Aug. 16-27, 2021, 8 pages.
"Discussion on UE Rx/Tx and/or gNB Rx/Tx timing delay mitigation", 3GPP TSG-RAN WG4 Meeting # 100-e, R4-2112598, Agenda: 9.21.2.2, Nokia, Aug. 16-27, 2021, 7 pages.
"Enhancements of UL-AOA Positioning Solution", 3GPP TSG RAN WG1 #104bis-e, R1-2103036, Agenda: 8.5.2, Intel Corporation, Apr. 12-20, 2021, 9 pages.
International Search Report and Written Opinion received for corresponding Patent Cooperation Treaty Application No. PCT/EP2022/073581, dated Feb. 6, 2023, 18 pages.
"Views on mitigating UE and gNB Rx/Tx timing errors", 3GPP TSG RAN WG1 #106-bis-e, R1-2109363, Agenda: 8.5.1, Nokia, Oct. 11-19, 2021, 10 pages.

* cited by examiner

FIG. 13(A)
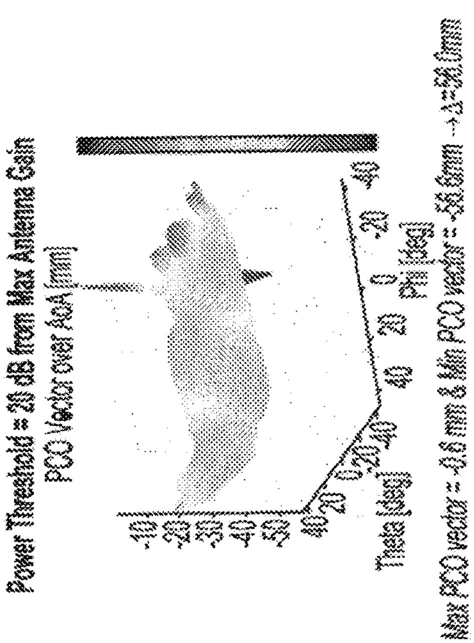
FIG. 13(B)
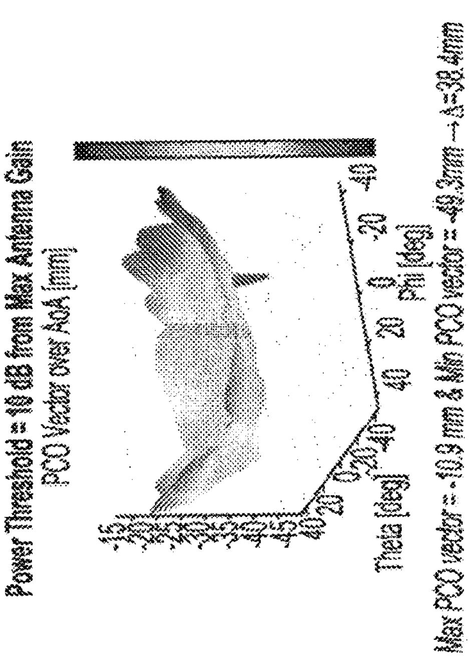
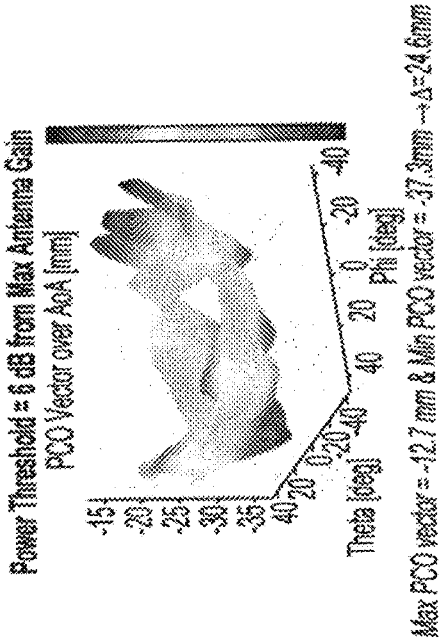
FIG. 13(C)
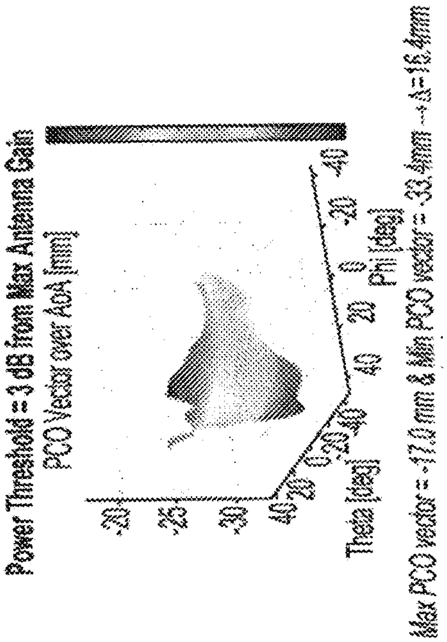
FIG. 13(D)

TIMING ERROR GROUP REPORTING WITH ANGULAR VALIDITY INDICATION

RELATED APPLICATION

This application was originally filed as PCT Application No. PCT/EP2022/073581, filed on Aug. 24, 2022, which claims priority from U.S. Provisional Application No. 63/250,698, filed on Sep. 30, 2021, each of which is incorporated herein by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for timing error group (TEG) reporting with angular validity indication.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include calculating, by a user equipment, an angular validity region around a reference direction for which at least one timing error group is valid. The method may further include transmitting, by the user equipment, at least one of the timing error groups comprising an indication about the angular validity region and a reference direction identifier associated with the reference direction to a location management node.

In accordance with certain example embodiments, an apparatus may include means for calculating an angular validity region around a reference direction for which at least one timing error group is valid. The apparatus may further include means for transmitting at least one of the timing error groups comprising an indication about the angular validity region and a reference direction identifier associated with the reference direction to a location management node.

In accordance with various example embodiments, a non-transitory computer readable medium may be encoded with instructions that may, when executed in hardware, perform a method. The method may include calculating an angular validity region around a reference direction for which at least one timing error group is valid. The method may further include transmitting at least one of the timing error groups comprising an indication about the angular validity region and a reference direction identifier associated with the reference direction to a location management node.

In accordance with some example embodiments, a computer program product may perform a method. The method may include calculating an angular validity region around a reference direction for which at least one timing error group is valid. The method may further include transmitting at least one of the timing error groups comprising an indication about the angular validity region and a reference direction identifier associated with the reference direction to a location management node.

In accordance with certain example embodiments, an apparatus may include at least one processor and at least one memory including computer program code. The at least one memory and the computer program code may be configured to, with the at least one processor, cause the apparatus to at least calculate an angular validity region around a reference direction for which at least one timing error group is valid. The at least one memory and the computer program code may be further configured to, with the at least one processor, cause the apparatus to at least transmit at least one of the timing error groups comprising an indication about the angular validity region and a reference direction identifier associated with the reference direction to a location management node.

In accordance with various example embodiments, an apparatus may include circuitry configured to calculate an angular validity region around a reference direction for which at least one timing error group is valid. The circuitry may further be configured to transmit at least one of the timing error groups comprising an indication about the angular validity region and a reference direction identifier associated with the reference direction to a location management node.

In accordance with some example embodiments, a method may include receiving, by a location management node, at least one timing error group comprising an indication about an angular validity region and a reference direction identifier associated with the reference direction from a user equipment.

In accordance with certain example embodiments, an apparatus may include means for receiving at least one timing error group comprising an indication about an angular validity region and a reference direction identifier associated with the reference direction from a user equipment.

In accordance with various example embodiments, a non-transitory computer readable medium may be encoded with instructions that may, when executed in hardware, perform a method. The method may include receiving at least one timing error group comprising an indication about an angular validity region and a reference direction identifier associated with the reference direction from a user equipment.

In accordance with some example embodiments, a computer program product may perform a method. The method may include receiving at least one timing error group comprising an indication about an angular validity region and a reference direction identifier associated with the reference direction from a user equipment.

In accordance with certain example embodiments, an apparatus may include at least one processor and at least one memory including computer program code. The at least one memory and the computer program code may be configured to, with the at least one processor, cause the apparatus to at least receive at least one timing error group comprising an indication about an angular validity region and a reference direction identifier associated with the reference direction from a user equipment.

In accordance with various example embodiments, an apparatus may include circuitry configured to receive at least one timing error group comprising an indication about an angular validity region and a reference direction identifier associated with the reference direction from a user equipment.

In accordance with some example embodiments, a method may include transmitting, by a user equipment, at least one user equipment capability associated with a maximum antenna delta gain supported by the user equipment for phase center offset variation assessment to a location management node. The method may further include receiving, by the user equipment, a list of antenna delta gain thresholds. The method may further include calculating, by the user equipment, at least one timing error group margin covering phase center offset variations associated with an entire evaluated radiation sphere of the list of antenna delta gain thresholds. The method may further include transmitting, by the user equipment, at least one timing error group associated with timing error group margins and the list of antenna delta gain thresholds to the location management node.

In accordance with certain example embodiments, an apparatus may include means for transmitting at least one user equipment capability associated with a maximum antenna delta gain supported by the user equipment for phase center offset variation assessment to a location management node. The apparatus may further include means for receiving a list of antenna delta gain thresholds. The apparatus may further include means for calculating at least one timing error group margin covering phase center offset variations associated with an entire evaluated radiation sphere of the list of antenna delta gain thresholds. The apparatus may further include means for transmitting at least one timing error group associated with timing error group margins and the list of antenna delta gain thresholds to the location management node.

In accordance with various example embodiments, a non-transitory computer readable medium may be encoded with instructions that may, when executed in hardware, perform a method. The method may include transmitting at least one user equipment capability associated with a maximum antenna delta gain supported by the user equipment for phase center offset variation assessment to a location management node. The method may further include receiving a list of antenna delta gain thresholds. The method may further include calculating at least one timing error group margin covering phase center offset variations associated with an entire evaluated radiation sphere of the list of antenna delta gain thresholds. The method may further include transmitting at least one timing error group associated with timing error group margins and the list of antenna delta gain thresholds to the location management node.

In accordance with some example embodiments, a computer program product may perform a method. The method may include transmitting at least one user equipment capability associated with a maximum antenna delta gain supported by the user equipment for phase center offset variation assessment to a location management node. The method may further include receiving a list of antenna delta gain thresholds. The method may further include calculating at least one timing error group margin covering phase center offset variations associated with an entire evaluated radiation sphere of the list of antenna delta gain thresholds. The method may further include transmitting at least one timing error group associated with timing error group margins and the list of antenna delta gain thresholds to the location management node.

In accordance with certain example embodiments, an apparatus may include at least one processor and at least one memory including computer program code. The at least one memory and the computer program code may be configured to, with the at least one processor, cause the apparatus to at least transmit at least one user equipment capability associated with a maximum antenna delta gain supported by the user equipment for phase center offset variation assessment to a location management node. The at least one memory and the computer program code may be further configured to, with the at least one processor, cause the apparatus to at least receive a list of antenna delta gain thresholds. The at least one memory and the computer program code may be further configured to, with the at least one processor, cause the apparatus to at least calculate at least one timing error group margin covering phase center offset variations associated with an entire evaluated radiation sphere of the list of antenna delta gain thresholds. The at least one memory and the computer program code may be further configured to, with the at least one processor, cause the apparatus to at least transmit at least one timing error group associated with timing error group margins and the list of antenna delta gain thresholds to the location management node.

In accordance with various example embodiments, an apparatus may include circuitry configured to transmit at least one user equipment capability associated with a maximum antenna delta gain supported by the user equipment for phase center offset variation assessment to a location management node. The circuitry may further be configured to receive a list of antenna delta gain thresholds. The circuitry may further be configured to calculate at least one timing error group margin covering phase center offset variations associated with an entire evaluated radiation sphere of the list of antenna delta gain thresholds. The circuitry may further be configured to transmit at least one timing error group associated with timing error group margins and the list of antenna delta gain thresholds to the location management node.

In accordance with some example embodiments, a method may include receiving, by a location management node, at least one user equipment capability associated with a maximum antenna delta gain supported by a user equipment for phase center offset variation assessment from the user equipment. The method may further include transmitting, by the location management node, a list of antenna delta gain thresholds to the user equipment. The method may further include receiving, by the location management node, at least one timing error group associated with timing error group margins and the list of antenna delta gain thresholds to the location management node.

In accordance with certain example embodiments, an apparatus may include means for receiving at least one user equipment capability associated with a maximum antenna delta gain supported by a user equipment for phase center offset variation assessment from the user equipment. The apparatus may further include means for transmitting a list of antenna delta gain thresholds to the user equipment. The apparatus may further include means for receiving at least one timing error group associated with timing error group margins and the list of antenna delta gain thresholds to the location management node.

In accordance with various example embodiments, a non-transitory computer readable medium may be encoded with instructions that may, when executed in hardware, perform a method. The method may include receiving at least one user equipment capability associated with a maximum antenna delta gain supported by a user equipment for phase center offset variation assessment from the user equipment. The method may further include transmitting a list of antenna delta gain thresholds to the user equipment. The method may further include receiving at least one timing error group associated with timing error group margins and the list of antenna delta gain thresholds to the location management node.

In accordance with some example embodiments, a computer program product may perform a method. The method may include receiving at least one user equipment capability associated with a maximum antenna delta gain supported by a user equipment for phase center offset variation assessment from the user equipment. The method may further include transmitting a list of antenna delta gain thresholds to the user equipment. The method may further include receiving at least one timing error group associated with timing error group margins and the list of antenna delta gain thresholds to the location management node.

In accordance with certain example embodiments, an apparatus may include at least one processor and at least one memory including computer program code. The at least one memory and the computer program code may be configured to, with the at least one processor, cause the apparatus to at least receive at least one user equipment capability associated with a maximum antenna delta gain supported by a user equipment for phase center offset variation assessment from the user equipment. The at least one memory and the computer program code may be further configured to, with the at least one processor, cause the apparatus to at least transmit a list of antenna delta gain thresholds to the user equipment. The at least one memory and the computer program code may be further configured to, with the at least one processor, cause the apparatus to at least receive at least one timing error group associated with timing error group margins and the list of antenna delta gain thresholds to the location management node.

In accordance with various example embodiments, an apparatus may include circuitry configured to receive at least one user equipment capability associated with a maximum antenna delta gain supported by a user equipment for phase center offset variation assessment from the user equipment. The circuitry may further be configured to transmit a list of antenna delta gain thresholds to the user equipment. The circuitry may further be configured to receive at least one timing error group associated with timing error group margins and the list of antenna delta gain thresholds to the location management node.

In accordance with some example embodiments, a method may include transmitting, by a user equipment, at least one user equipment capability associated with a probability parameter to a location management node. The method may further include receiving, by the user equipment, a list of antenna delta gain thresholds. The method may further include calculating, by the user equipment, a timing error group margin associated with a probability parameter of a phase center offset variation over an entire evaluated radiation sphere. The method may further include transmitting, by the user equipment, at least one timing error group associated with timing error group margins and the list of antenna delta gain thresholds to the location management node.

In accordance with certain example embodiments, an apparatus may include means for transmitting at least one user equipment capability associated with a probability parameter to a location management node. The apparatus may further include means for receiving a list of antenna delta gain thresholds. The apparatus may further include means for calculating a timing error group margin associated with a probability parameter of a phase center offset variation over an entire evaluated radiation sphere. The apparatus may further include means for transmitting at least one timing error group associated with timing error group margins and the list of antenna delta gain thresholds to the location management node.

In accordance with various example embodiments, a non-transitory computer readable medium may be encoded with instructions that may, when executed in hardware, perform a method. The method may include transmitting at least one user equipment capability associated with a probability parameter to a location management node. The method may further include receiving a list of antenna delta gain thresholds. The method may further include calculating a timing error group margin associated with a probability parameter of a phase center offset variation over an entire evaluated radiation sphere. The method may further include transmitting at least one timing error group associated with timing error group margins and the list of antenna delta gain thresholds to the location management node.

In accordance with some example embodiments, a computer program product may perform a method. The method may include transmitting at least one user equipment capability associated with a probability parameter to a location management node. The method may further include receiving a list of antenna delta gain thresholds. The method may further include calculating a timing error group margin associated with a probability parameter of a phase center offset variation over an entire evaluated radiation sphere. The method may further include transmitting at least one timing error group associated with timing error group margins and the list of antenna delta gain thresholds to the location management node.

In accordance with certain example embodiments, an apparatus may include at least one processor and at least one memory including computer program code. The at least one memory and the computer program code may be configured to, with the at least one processor, cause the apparatus to at least transmit at least one user equipment capability associated with a probability parameter to a location management node. The at least one memory and the computer program code may be further configured to, with the at least one processor, cause the apparatus to at least receive a list of antenna delta gain thresholds. The at least one memory and the computer program code may be further configured to, with the at least one processor, cause the apparatus to at least calculate a timing error group margin associated with a probability parameter of a phase center offset variation over an entire evaluated radiation sphere. The at least one memory and the computer program code may be further configured to, with the at least one processor, cause the apparatus to at least transmit at least one timing error group associated with timing error group margins and the list of antenna delta gain thresholds to the location management node.

In accordance with various example embodiments, an apparatus may include circuitry configured to transmit at least one user equipment capability associated with a probability parameter to a location management node. The circuitry may further be configured to receive a list of antenna delta gain thresholds. The circuitry may further be configured to calculate a timing error group margin associated with a probability parameter of a phase center offset variation over an entire evaluated radiation sphere. The circuitry may further be configured to transmit at least one timing error group associated with timing error group margins and the list of antenna delta gain thresholds to the location management node.

In accordance with some example embodiments, a method may include receiving, by a location management node, at least one user equipment capability associated with a probability parameter from a user equipment. The method may further include transmitting, by the location management node, a list of antenna delta gain thresholds to the user equipment. The method may further include receiving, by the location management node, at least one timing error group associated with timing error group margins and the list of antenna delta gain thresholds to the location management node.

In accordance with certain example embodiments, an apparatus may include means for receiving at least one user equipment capability associated with a probability parameter from a user equipment. The apparatus may further include means for transmitting a list of antenna delta gain thresholds to the user equipment. The apparatus may further include means for receiving at least one timing error group associated with timing error group margins and the list of antenna delta gain thresholds to the location management node.

In accordance with various example embodiments, a non-transitory computer readable medium may be encoded with instructions that may, when executed in hardware, perform a method. The method may include receiving at least one user equipment capability associated with a probability parameter from a user equipment. The method may further include transmitting a list of antenna delta gain thresholds to the user equipment. The method may further include receiving at least one timing error group associated with timing error group margins and the list of antenna delta gain thresholds to the location management node.

In accordance with some example embodiments, a computer program product may perform a method. The method may include receiving at least one user equipment capability associated with a probability parameter from a user equipment. The method may further include transmitting a list of antenna delta gain thresholds to the user equipment. The method may further include receiving at least one timing error group associated with timing error group margins and the list of antenna delta gain thresholds to the location management node.

In accordance with certain example embodiments, an apparatus may include at least one processor and at least one memory including computer program code. The at least one memory and the computer program code may be configured to, with the at least one processor, cause the apparatus to at least receiving at least one user equipment capability associated with a probability parameter from a user equipment. The at least one memory and the computer program code may be further configured to, with the at least one processor, cause the apparatus to at least transmitting a list of antenna delta gain thresholds to the user equipment. The at least one memory and the computer program code may be further configured to, with the at least one processor, cause the apparatus to at least receiving at least one timing error group associated with timing error group margins and the list of antenna delta gain thresholds to the location management node.

In accordance with various example embodiments, an apparatus may include circuitry configured to receive at least one user equipment capability associated with a probability parameter from a user equipment. The circuitry may further be configured to transmit a list of antenna delta gain thresholds to the user equipment. The circuitry may further be configured to receive at least one timing error group associated with timing error group margins and the list of antenna delta gain thresholds to the location management node.

BRIEF DESCRIPTION OF THE DRAWINGS:

For proper understanding of example embodiments, reference should be made to the accompanying drawings, wherein:

FIG. 13(A) illustrates an example of UE antenna PCO variation enhanced TEG reporting where PCO_DB_TH=20 dB according to various embodiments.

FIG. 13(B) illustrates an example of UE antenna PCO variation enhanced TEG reporting where PCO_DB_TH=10 dB according to various embodiments.

FIG. 13(C) illustrates an example of UE antenna PCO variation enhanced TEG reporting where PCO_DB_TH=6 dB according to various embodiments.

FIG. 13(D) illustrates an example of UE antenna PCO variation enhanced TEG reporting where PCO_DB_TH=3 dB according to various embodiments.

DETAILED DESCRIPTION:

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for TEG reporting with angular validity indication is not intended to limit the scope of certain example embodiments, but is instead representative of selected example embodiments.

Third Generation Partnership Project (3GPP) Release (Rel)-16 includes several developments related to native positioning support, including downlink time difference of arrival (DL-TDOA), uplink time difference of arrival (UL-TDOA), downlink angle of departure (DL-AoD), uplink angle of arrival (UL-AoA), and multi-cell round trip time (Multi-RTT). The developments specify solutions to enable radio access technology (RAT) dependent (for both frequency range (FR)1 and FR2), as well as RAT independent, NR positioning techniques. Specifically, in the downlink (DL), a new positioning reference signal (PRS) was introduced, while in the uplink (UL) a new sounding reference signal (SRS) for positioning (SRS-P) was introduced.

For 3GPP Rel-17, general position accuracy in the submeter range is a goal, and specifically for industrial internet of things (IIOT) cases, the goal may include further tightened targeting centimeter accuracy. DL-TDOA is one of the 3GPP Rel-16 methods specified, which may be either UE-assisted or UE-based. For UE-assisted positioning, the UE may measure PRS TOA, and report a reference signal time difference (RSTD) to the network/location management function (LMF) for UE position calculation. Alternatively, for UE-based positioning, the UE may receive information about the position of the involved gNBs in the positioning assistance data, and may estimate its own position based on the positioning assistance data and PRS TOA measurements. LMF may be realized, for example, by a location management node. In some examples, location management node comprises a location management function (LMF).

Figure 1:
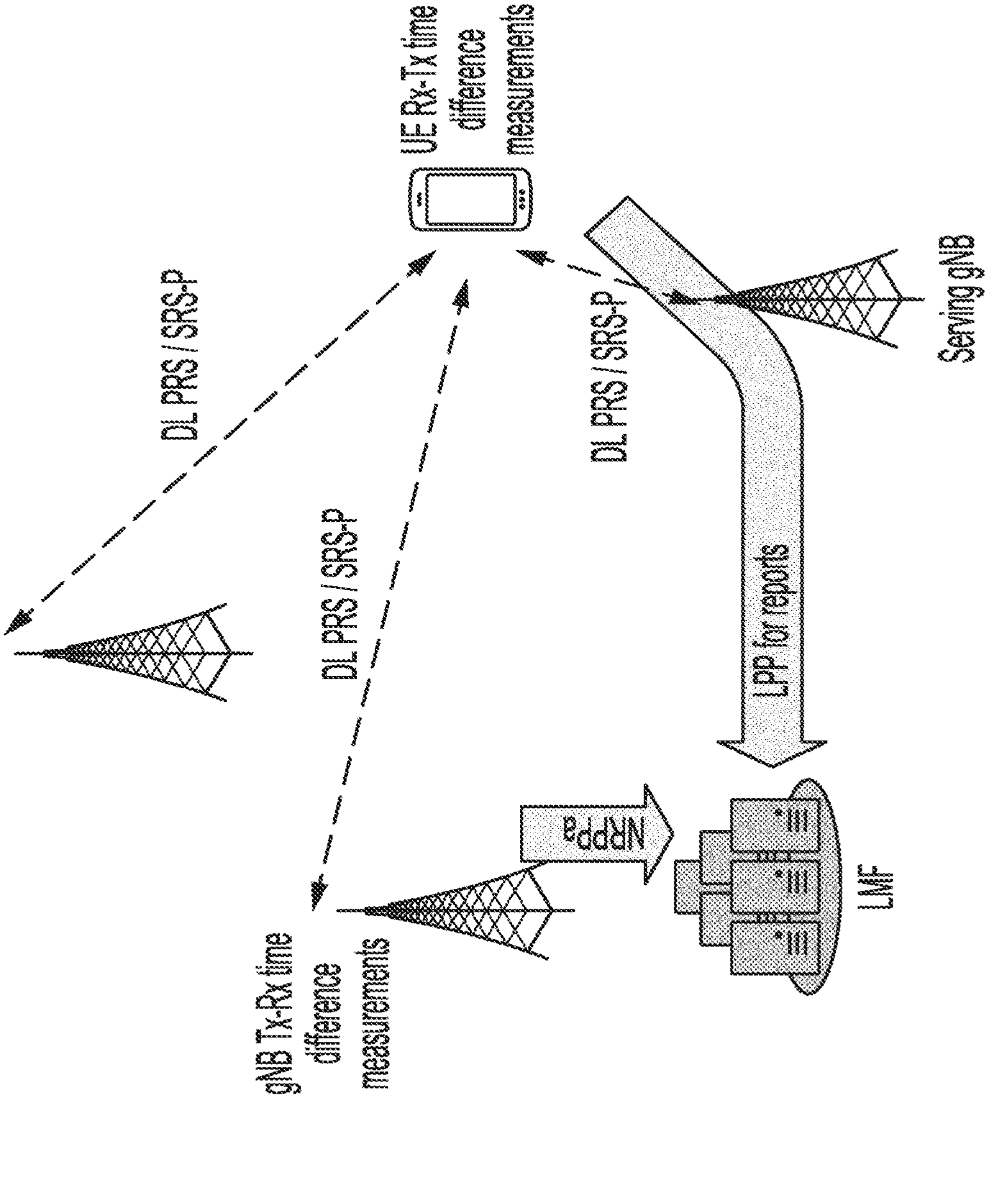
FIG. 1 illustrates an overview of a multi-round trip delay (RTT) technique.

Multi-RTT is another 3GPP Rel-16 method that may rely on both UL and DL measurements/signals. As illustrated in FIG. 1, multiple gNBs may transmit the DL PRS to the UE, which may then transmit the SRS-P to the gNBs. The UE may measure the UE Rx-Tx time difference for each cell, while each gNB may measure the gNB Rx-Tx time difference for the UE. These measurements may be reported to the LMF, which may then estimate the RTT to each gNB from the UE, and therefore, may estimate the position of the UE.

Figure 2:
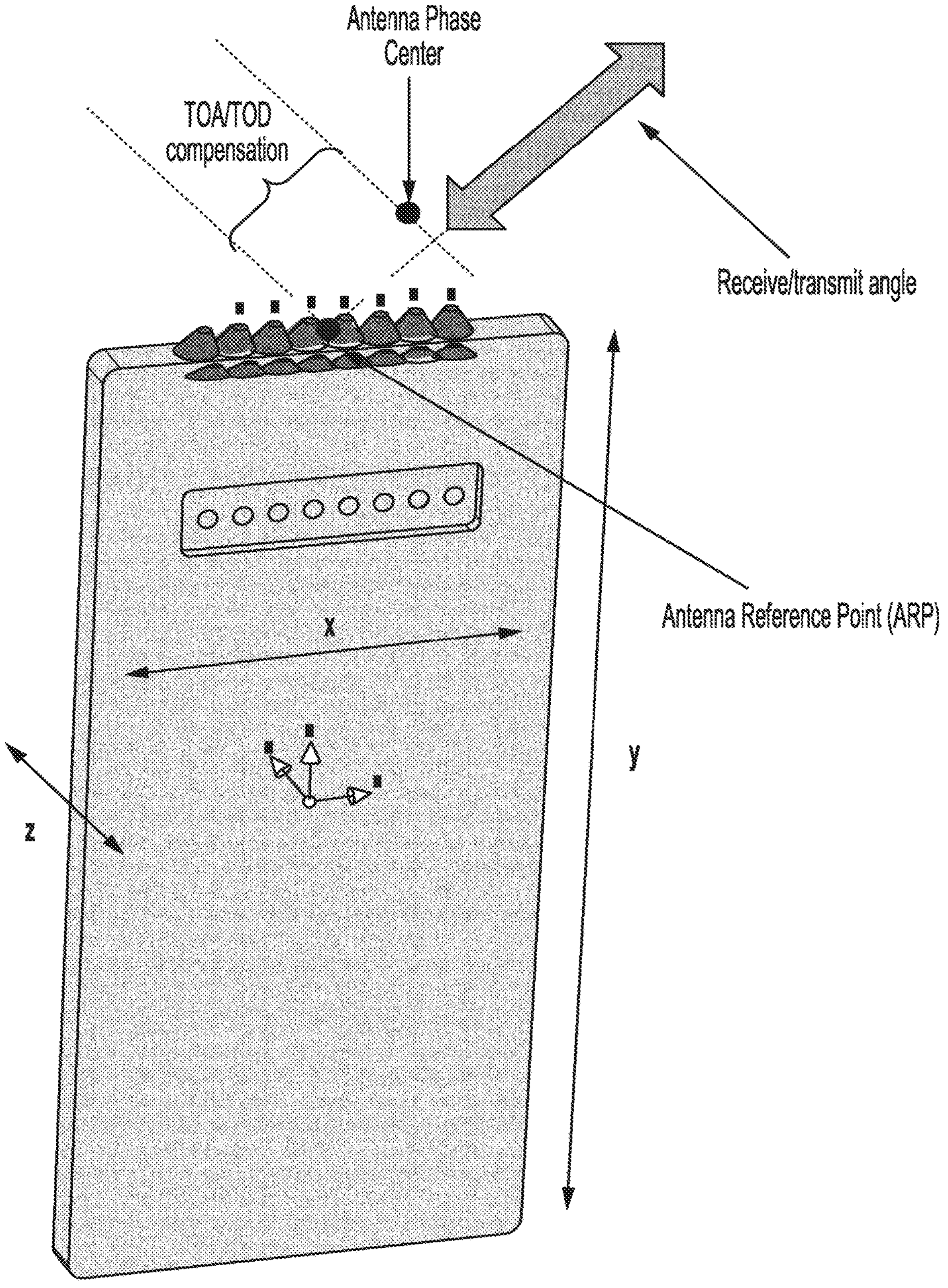
FIG. 2 illustrates an example of a UE mmWave 1:8 antenna array mounted on a UE form-factor design.

A precise assessment of DL PRS time of arrival (TOA) and/or the UL SRS time of departure (TOD) at the UE may be important for obtaining accurate positioning measurements. Highly accurate TOA/TOD measurements may be important to obtain a precise measure of the phase reference position for the signal being received or transmitted via the UE antenna. As shown in FIG. 2, this reference position may be the antenna phase center, which may be fixed and align with the physical antenna reference point (ARP). However, the antenna phase center may not always align with the physical ARP, and instead, may be located at an offset.

Figure 3:
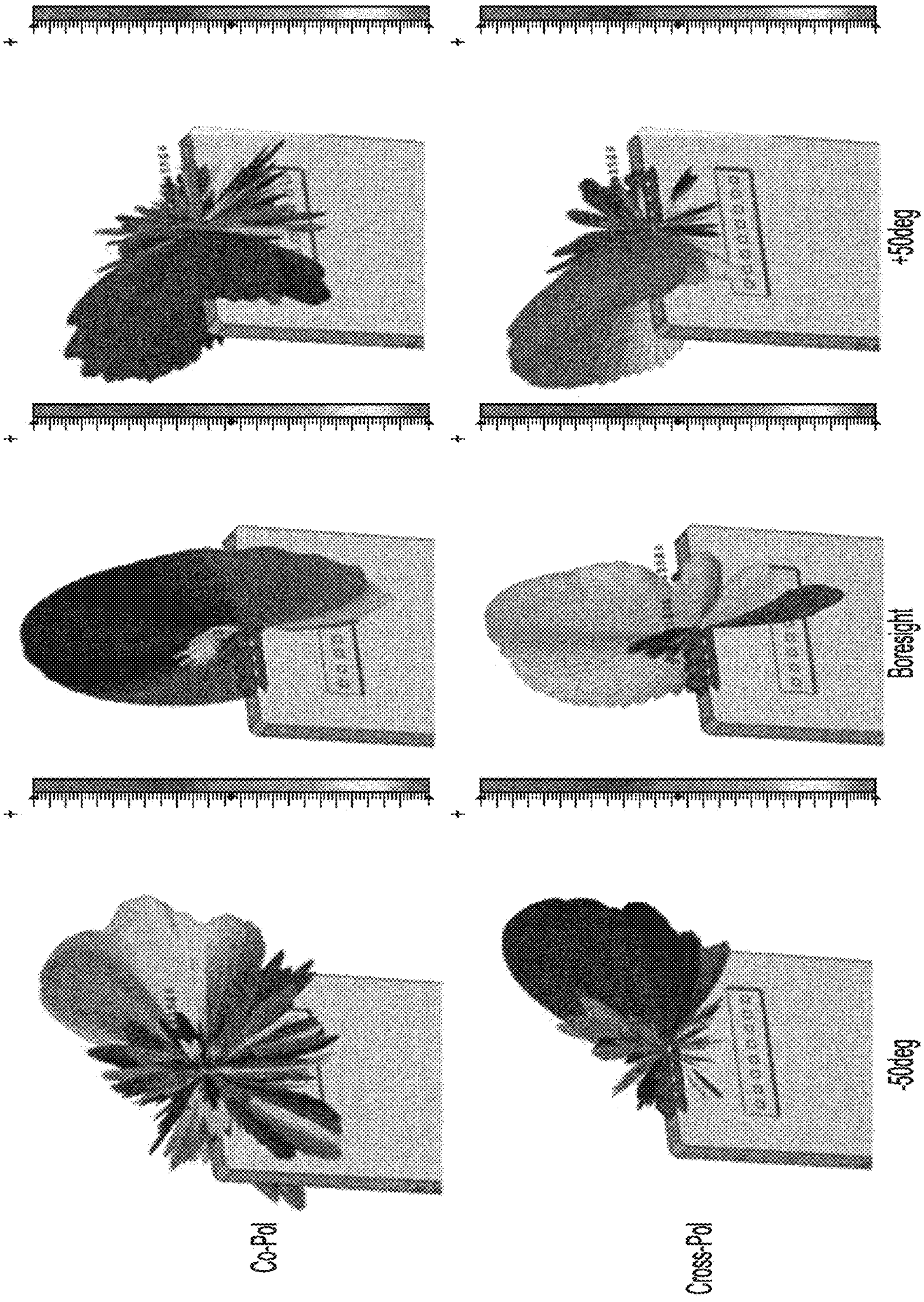
FIG. 3 illustrates examples of phase plots for UE form factors.
Figure 3:
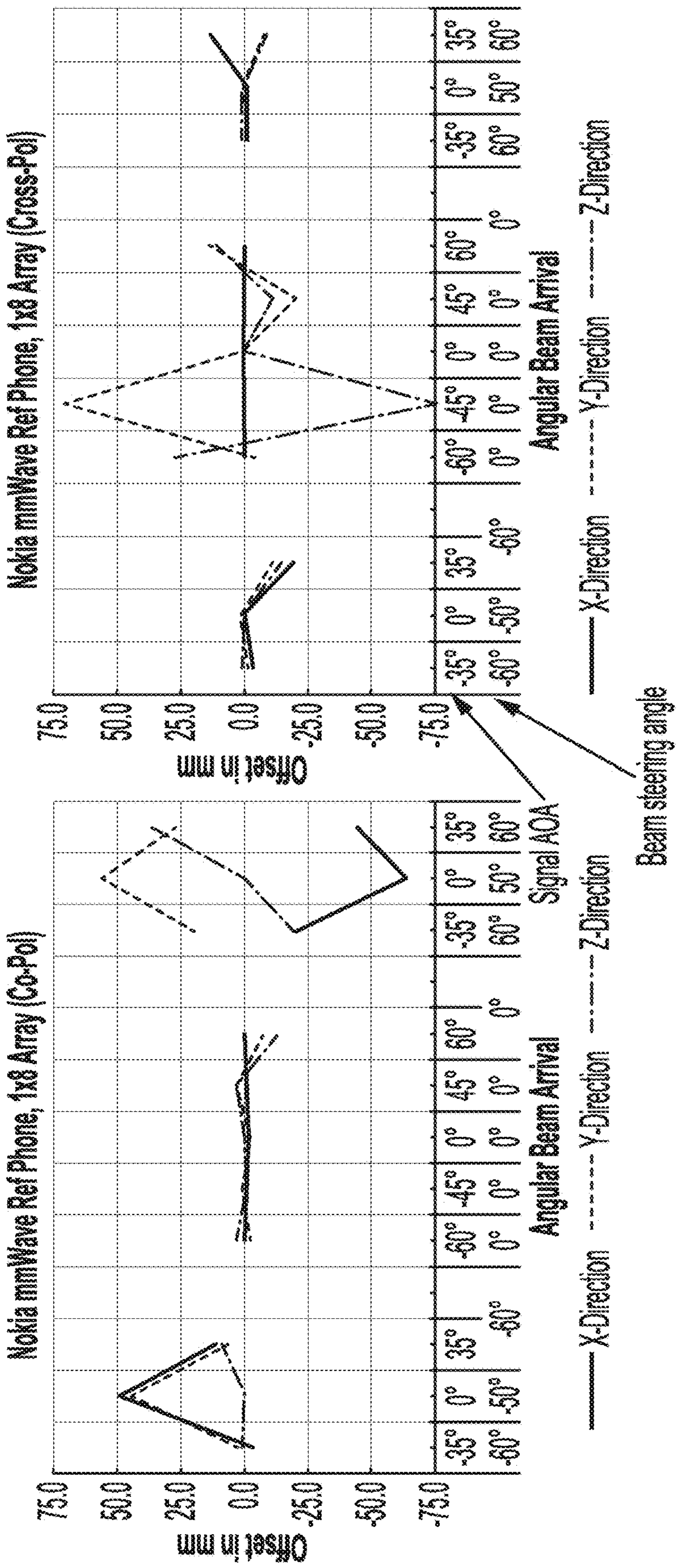

FIG. 3 illustrates an example of UE antenna array radiation phase variation over beam steering angle and direction of signal, plus the associated offset (in mm) from the assumed ARP. The UE antenna array phase center location may be dynamic, and may be sensitive to: the actual UE form factor design (with current flow influenced by physical dimensions, mounted proximity components, materials, etc.); the antenna array cover (e.g., PC-ABS, glass); the AOA and polarization for broad beam configuration; the antenna array beam steering angle; AOA on the "banana" shape beam pattern for 1 dimensional antenna arrays; and the polarization at used beam steering angle.

The antenna array phase center may vary dynamically by several centimeters, and if left uncompensated, it may be an impairment that significantly reduces the position estimation accuracy for centimeter accuracy applications (e.g., IIoT). Some solutions for UE local and network assisted compensation of the UE PCO impact on positioning reference signal TOA/TOD based on UE characterization depend upon UE awareness of AoA/AOD for the receive/transmit signal; however, no such solution exists when no UE awareness of AoA/AOD is available.

Figure 4:
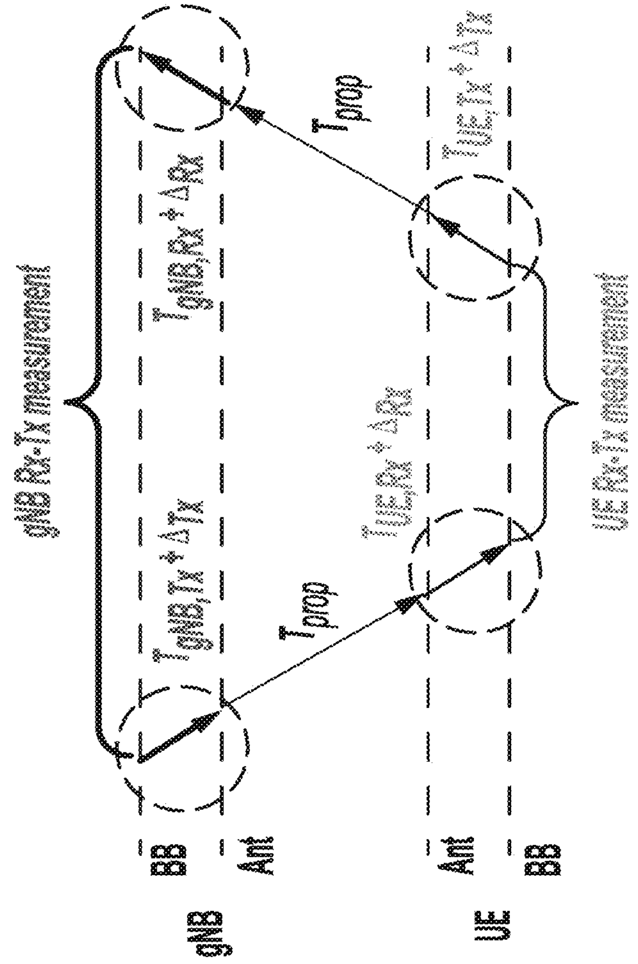
FIG. 4 illustrates an example of UE and gNB TX/RX timing errors.

FIG. 4 depicts an example of 3GPP TEG, where group delays may correspond to the timing delay between the baseband and the antenna. Group delays may also be time varying, and may depend on specific analog and/or digital parts/paths (i.e., panel/RF chain specific), frequency, temperature, and/or calibration errors. Typically, a device may be calibrated for these delays, but due to the time varying nature, calibrations may not be perfect, thereby generating residual group delays that result in positioning estimation errors (i.e., 3GPP Tx/Rx timing errors). For example, while 1 ns may result in a 30 cm timing error, 3GPP Rel-17 requirements may only allow 20 cm of total accuracy error.

For a 3GPP TEG solution, two transmissions/receptions using same RF chain/panel/frequency and near in time may have very similar group delays, even if the absolute value is unknown. Thus, differential operations may be possible (e.g., if the UE measures RSTD with the same RF chain/panel/frequency, the RSTD measurement may not be impacted by the Rx timing error). These are at least some of the factors that motivated the establishment of TEG. Each TEG may have an ID associated with it. So, if two measurements have the same TEG ID, it may be assumed that they experience the same timing error (within a certain margin), which may apply for both Tx and Rx sides in both DL and UL measurements.

TEG definition may have a few open issues, including that the definition of TEGs may have a certain margin associated with them, but no solution on how to signal this margin. One option is for the UE to send a set of TEG IDs and their associated margins during capability signaling; for example, a UE may report TEG 1, 1 nanosecond (ns) margin; TEG 2, 0.1 ns margin; TEG 3, 1 ns margin; and TEG 4, 0.1 ns margin. During reporting, the UE may then simply report the TEG ID associated with a particular transmission or measurement. Another option could be a more dynamic TEG reporting, wherein for each measurement, the UE may report a TEG ID as well as the margin of the TEGs currently.

Figure 5:
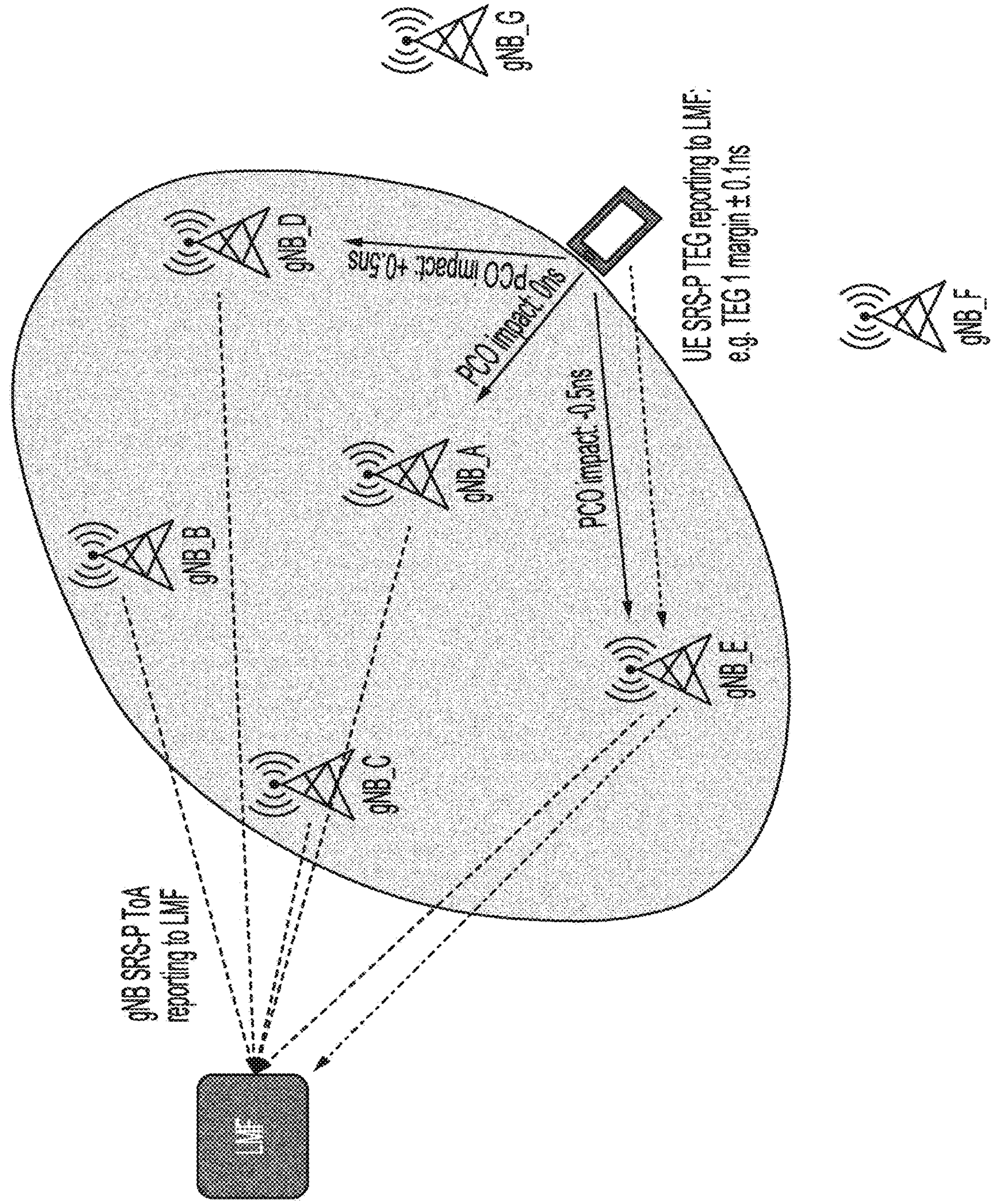
FIG. 5 illustrates an example of UE SRS-P transmissions towards multiple gNBs with associated TEG reporting.
Figure 6B:
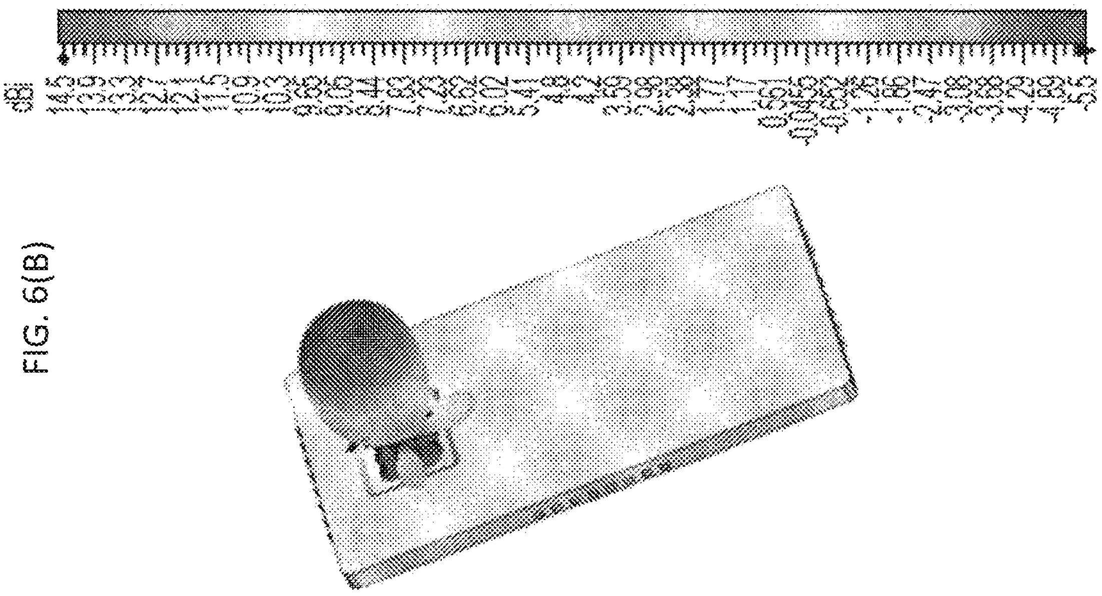
FIG. 6(B) illustrates an example of a narrow beam utilizing the full array.
Figure 6A:
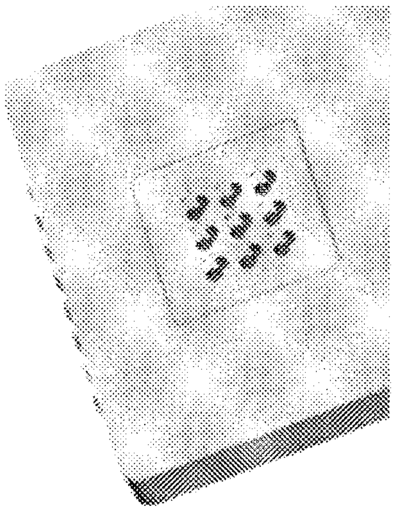
FIG. 6(A) illustrates an example of a reference 3×3 antenna array design.
Figure 6D:
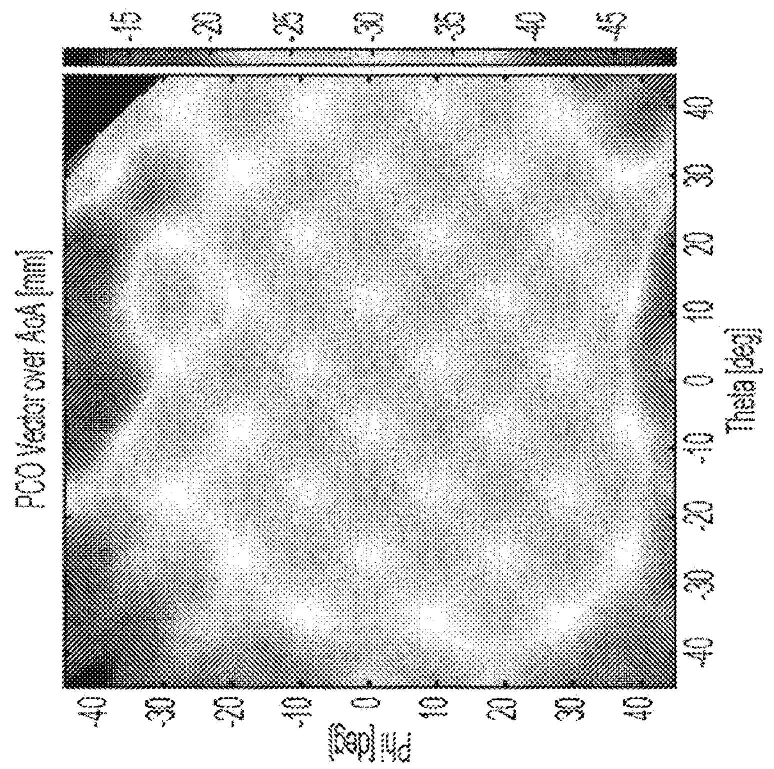
FIG. 6(D) illustrates an example of PCO vector for the wide boresight beam, evaluated for ±45° for both Θ and Φ.
Figure 6C:
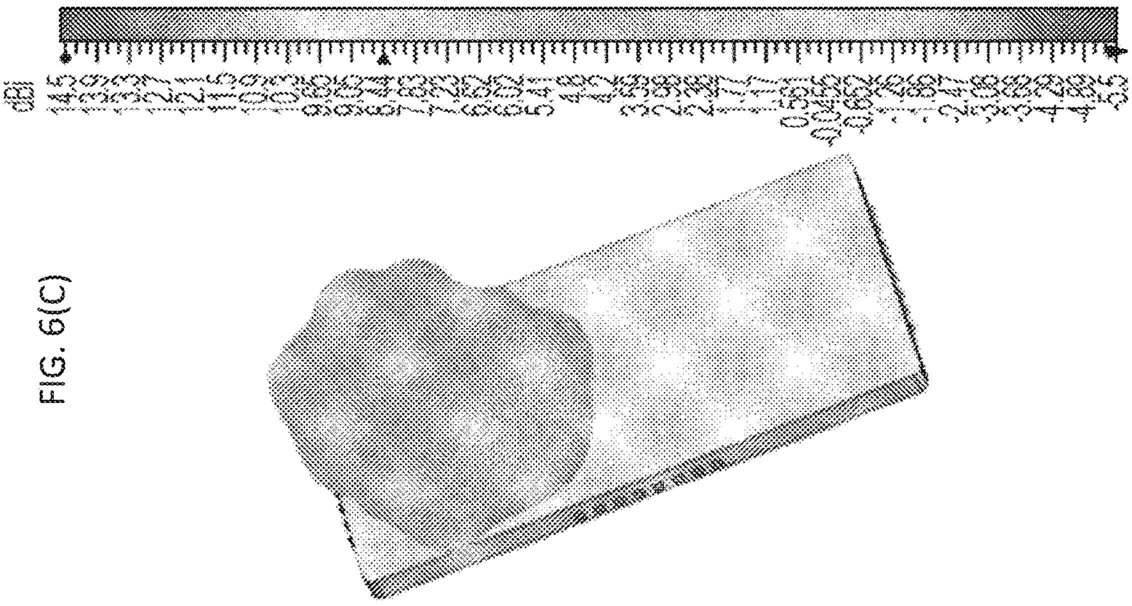
FIG. 6(C) illustrates an example of wide boresight beam using only 1 patch.

In IIOT deployment scenarios having strict cm accuracy positioning requirements, the UE industrial design compromises may be less severe as compared to a small form factor smart phone, for example. For such IIoT devices, form factor constraints may be relaxed, and the antenna arrays may be square compared to one dimensional for the smart phone application. Furthermore, these designs do not necessarily need display and/or glass covers, which may further smooth the PCO variation over AoA/AoD. Such IIoT device designs, while less abrupt, may still experience significant PCO variation over the radiation sphere, and when reporting the TEG with certain margins for a given SRS-P transmission received by more gNBs, this variation may need to be considered by the UE to deliver accurate TEG reporting. FIG. 5 illustrates an example of a UE SRS-P transmission towards several gNBs, where the UE reports SRS-P TEG 1 with a margin ±0.1 ns, corresponding to ±3 cm. However, this report may only be valid in the direction of gNB_A where the PCO delta impact is Ons. In the direction of gNB_D and gNB_E, the PCO impact may be +0.5 ns/−0.5 ns, respectively; thus, the TEG reporting may be invalid for SRS-P reception in those directions (i.e., towards gNB_D and gNB_E).

FIG. 6 illustrates a simulation of a 3×3 antenna array at 28 GHz including only the chassis of the device, whereby the antenna array is not covered by any materials. The wide boresight beam shown in FIG. 6*c* may be used when receiving and transmitting positioning reference signals from/to multiple gNBs simultaneously, when the angular direction of some of those gNBs are not known at the UE. FIG. 6*d* depicts that the variation of the PCO vector is still high for such an IIoT device with optimized antenna design. In this example, a variation of 4 cm (−10 mm to −50 mm) may be observed, which may be too high for an application with a cm positioning accuracy requirement.

Certain example embodiments described herein may have various benefits and/or advantages to overcome at least the disadvantages described above. For example, certain example embodiments may reduce PCO variation and the associated impacts on TEG reporting validity for SRS-P transmissions received by gNBs in different directions. Furthermore, various example embodiments may enable an LMF to evaluate expected ToA accuracy for SRS-P transmissions received by gNBs in different directions despite significant and direction dependent UE antenna PCO variation. In addition, certain example embodiments may enable increased UE positioning accuracy compared to deployments without taking the UE direction dependent PCO variation into account. Thus, certain example embodiments discussed below are directed at least to improvements in computer-related technology.

Figure 7:
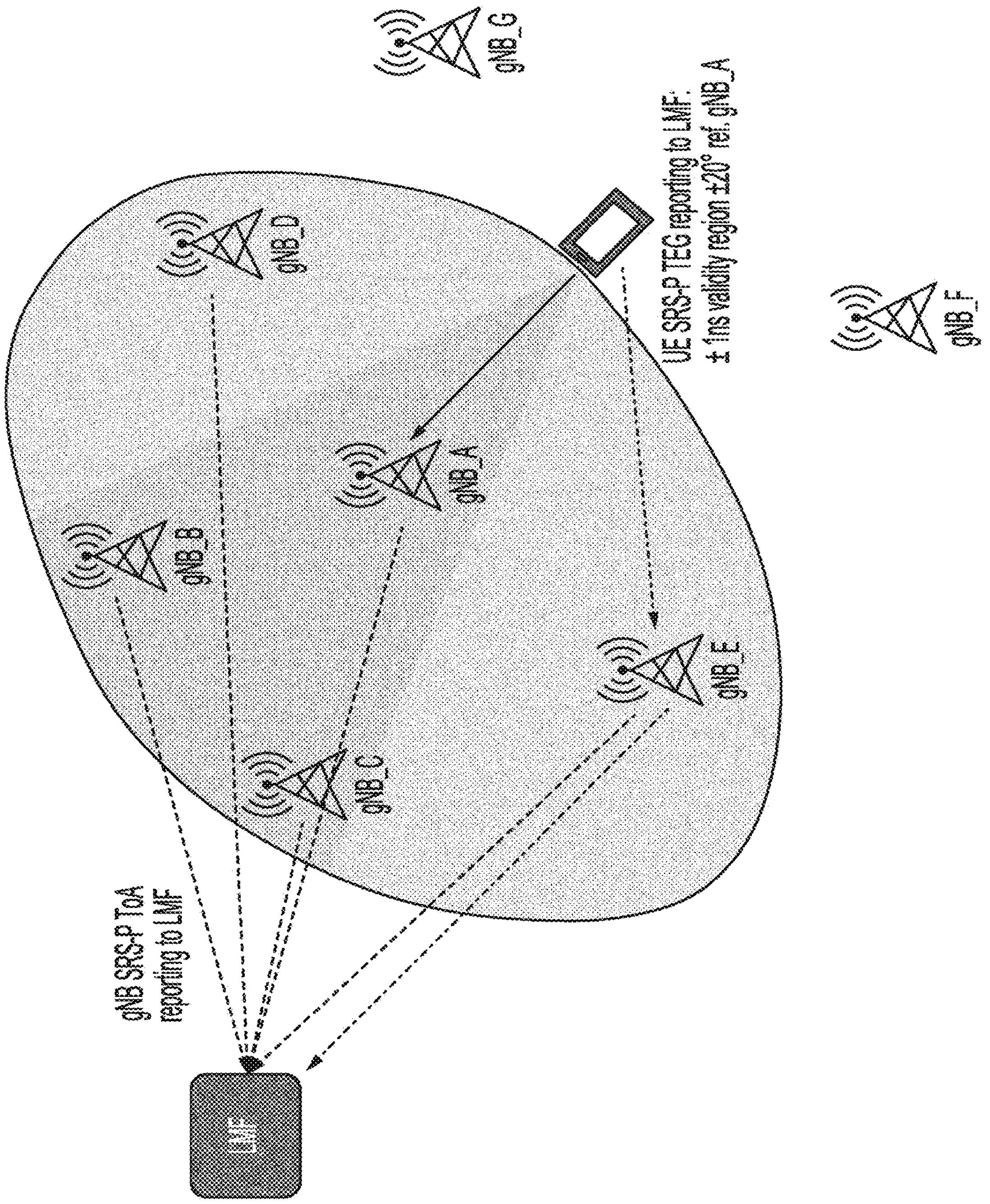
FIG. 7 illustrates an example of UE antenna phase center offset (PCO) variation enhanced TEG reporting according to various embodiments.

Some embodiments described herein enable novel and inventive UE TEG reporting including information on the angular radiated validity region for which the reported TEG remains valid. By receiving this information, the LMF may evaluate the UE PCO related delta error for SRS-P ToA reports from different gNBs based on the UE TEG report information and the relative location of the reporting gNBs. As an example, the UE may report that the SRS-P transmission is associated with TEG 1 with certain margin ±1 ns, which may be valid within an angular validity region of ±20° with reference to a known direction of gNB_A, for example. In an example embodiment shown in FIG. 7, the UE UL radiation pattern may cover gNB_A-E, but just gNB_B and C are within the ±20° window ref. gNB_A. Reference to a known direction (e.g. gNB_A) may be referred to herein as reference direction. However, reference direction may include other directions than directions to a known gNB location. Examples of such reference directions may be known directions to a certain other element of the network. In general, a UE may indicate reference direction identifiers, such as a gNB identifier, together with an angular validity region. The reference direction identifier may thus indicate a certain reference direction associated with a certain angular validity region. While some various example embodiments discussed herein relate to SRS-P, it is noted that positioning may be performed using any reference signal.

By receiving the validity region enhanced TEG report from the UE and the SRS-P ToA reports from gNB_A-E, the LMF may estimate the rough location of the UE, and conclude that gNB_B and C are within the validity region. In addition, the LMF may confirm that the SRS-P ToA reports from gNB_A-C are within the TEG 1 +-1 ns error window. The LMF may then combine measurements better for differential processing within the TEG and/or remove measurements belonging to gNBs outside the validity region in order to improve the overall performance. The UE may additionally report TEG X with a certain margin +-y ns associated with, for example, the full radiation coverage area, which in this case, may be valid for gNB_D and E as well. By obtaining this information, the LMF may perform a weighting of the gNB positioning measuring reports, thereby increasing the accuracy of the positioning estimate.

In general, for each supported beam configuration in the embodiments described herein, the UE may have locally stored a characterised mapping of the PCO variation over the radiation sphere down to PCO_DB_TH_MAX (e.g., 20 dB) below the max gain direction. In addition, the UE may extract the PCO variation for the used beam configuration over the radiation sphere/surface down to a threshold PCO_DB_TH (y dB) below the maximum gain direction. The UE may then report the TEG ranges to the LMF, or receive TEG ranges from the LMF. PCO_DB_TH MAX may be referred to herein also as maximum antenna delta gain. The maximum antenna delta gain may be indicated by the UE to the network (e.g., to LMF), and may be used for PCO variation assessment. PCO_DB_TH may be referred to herein also as antenna delta gain threshold. PCO_DB_TH may be smaller than or equal to PCO_DB_TH_MAX. Antenna delta gain threshold may also be used for PCO variation assessment.

While certain example embodiments are discussed below in relation to UL SRS-P transmissions and associated Tx TEG reporting, various embodiments may also apply to Rx TEG reporting as well.

Figure 8:
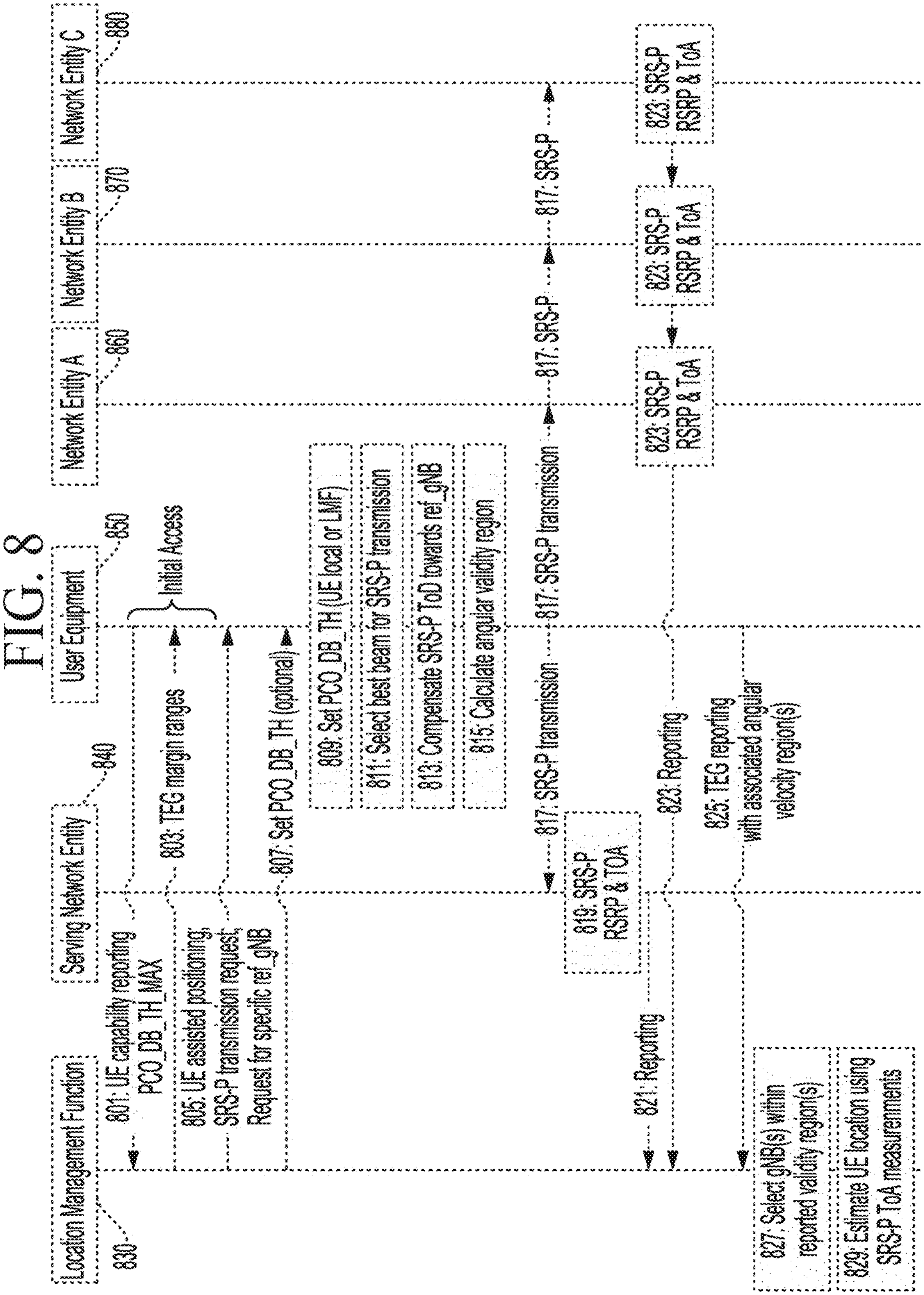
FIG. 8 illustrates an example of a signaling diagram according to certain example embodiments.
Figure 22:
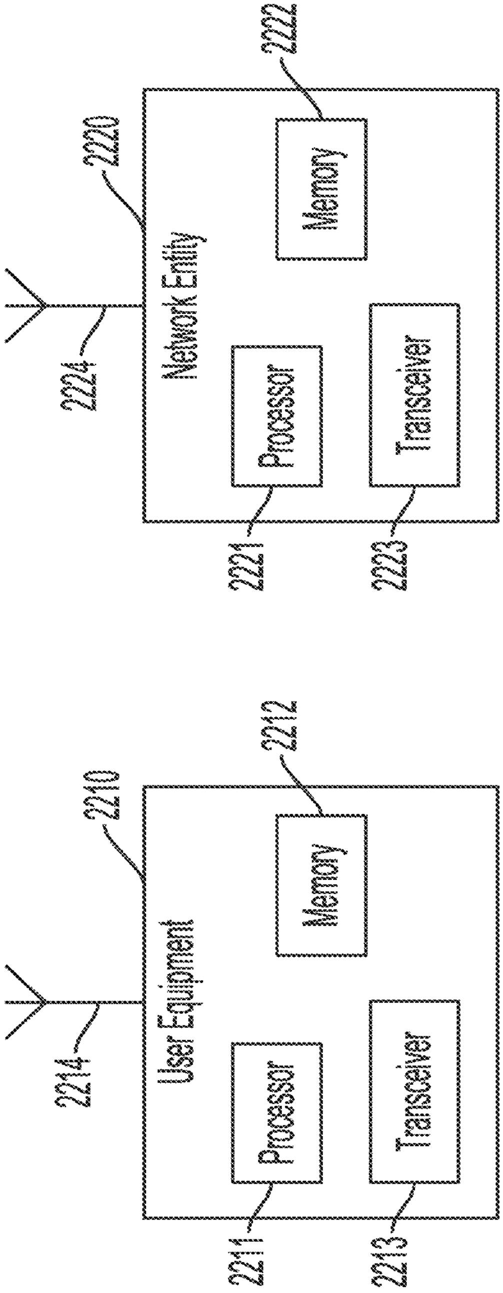
FIG. 22 illustrates an example of various network devices according to some example embodiments.

FIG. 8 illustrates an example of a signaling diagram depicting TEG reporting with angular validity indication, according to an example embodiment. In the example of FIG. 8, the UE may have awareness of direction of at least one gNB. LMF 830, serving NE 840, UE 850, NE A 860, NE B 870, and NE C 880 may be similar to UE 2210 and NE 2220, as illustrated in FIG. 22, according to certain example embodiments. In general, the procedure illustrated in FIG. 8 as Initial Access may occur at any time prior to the positioning session.

In the example of FIG. 8, at 801, UE 850 may report PCO_DB_TH MAX to LMF 830, for example, via UE capability info to notify LMF 830 of a threshold maximum, which may be a maximum boundary for any UE validity region evaluation. In addition, UE 850 may report UE specific TEG ranges and associated certain margins to LMF 830. Alternatively, at 803, LMF 830 may transmit TEG ranges and certain margins to UE 850.

In the example of FIG. 8, at 805, LMF 830 may transmit UE assisted positioning data, SRS-P transmission requests (or some other reference signal transmission request), and/or requests for specific ref_gNBs. In some example embodiments, UE 850 may be aware of the direction of at least one reference gNB (i.e., ref_gNB). As an example, the awareness of direction of a ref gNB may be obtained from DL AoA estimation and/or DL aligned beam configuration reused for UL. LMF 830 may also request a TEG report with reference to specific ref_gNBs.

In certain optional embodiments, at 807, a threshold PCO_DB TH used at a given positioning instance may be signalled by LMF 830 to UE 850 to provide adjustment flexibility, or at 809, the threshold PCO_DB_TH may be set by UE 850. If PCO_DB_TH is set by UE 850, it may be determined based on received power in the DL from multiple gNBs, such as NE 860-880. In an example embodiment, UE 850 may determine that X gNBs are within PCO_DB_TH of each other in the DL, and perform the UL determination based upon X. In various example embodiments, where UE 850 is setting PCO_DB_TH, UE 850 may evaluate the DL RSRP spread of various measurements (e.g., the X strongest gNBs, wherein UE 850 sets X and uses this spread as PCO_DB_TH for the UL TEG angular validity region assessment).

At 811, UE 850 may select a beam configuration for the SRS-P transmission (e.g., narrow or wide beam), and optionally at 813, UE 850 may compensate SRS-P ToD towards the ref_gNB(s) (i.e., PCO impact is cancelled in direction of the reference gNB). For example, the UE 850 may select a best beam configuration at 811 amongst a plurality of possible beam configurations. As an example, a best beam configuration may be selected by selecting the beam having the largest angular validity region and/or a beam which meets a minimum angular range for a given TEG margin. UE 850 may also select the best beam based on received power (i.e., beam which will be strongest) and/or based on line of sight status of a given link.

At 815, UE 850 may calculate (for example, based on the PCO variation characterization data for the selected beam configuration) an angular validity region around the reference direction, such as reference gNB direction, for which the different TEGs are still valid. In various example embodiments, this may be a worst-case angular region in degrees around the reference gNB direction for which the TEG is still valid. If the orientation of UE 850 relative to the receiving gNBs is known, then the angular validity region could be enhanced to reporting angles separately for Θ and Φ directions. Thus, in some example embodiments, the angular validity region may comprise angular validity region for each of a plurality of directions (i.e., Θ and Φ directions). In addition, angular validity region reporting may also include regions with likelihood of being within the specified TEG of less than 100% (e.g., 90%) to enlarge the validity region. In general terms, PCO variation may be assessed (referred to herein also as PCO variation assessment), and the angular validity region may be determined based on the PCO variation assessment. PCO variation assessment may comprise the UE determining or obtaining PCO variation for a given value of PCO_DB_TH. Moreover, UE 850 may determine the angular validity region as the area where the PCO variation is below a certain threshold with said value of PCO_DB_TH. This certain threshold may refer to the margins of TEG. For example, TEG margin may be 0.1 ns or 1 ns, as discussed above.

In the example of FIG. 8, at 817, UE 850 may transmit SRS-P transmissions to serving NE 840, as well as NE 860-880. At 819, serving NE 840 may determine SRS-P RSRP & TOA, and report these results to LMF 830 at 821.

In the example of FIG. 8, at 825, UE 850 may report at least one TEG with associated validity region (i.e., angular validity region) and ref_gNB ID to LMF 830. It may be beneficial for UE 850 to report more than one TEG to enable LMF 830 to evaluate accuracy degradation for gNBs outside the validity region of the at least one TEG. The reported TEGs may also be associated with multiple PCO_DB_TH values. For example, each reported TEG (i.e., one or more TEGs) may be reported together with associated angular validity region.

In the example of FIG. 8, at 827, LMF 830 may select any of NE 860-880, and at 829, use approximate locations of UE 850 and the known locations of selected NE 860-880 to determine which measurements fall within the at least one reported validity region.

Figure 9:
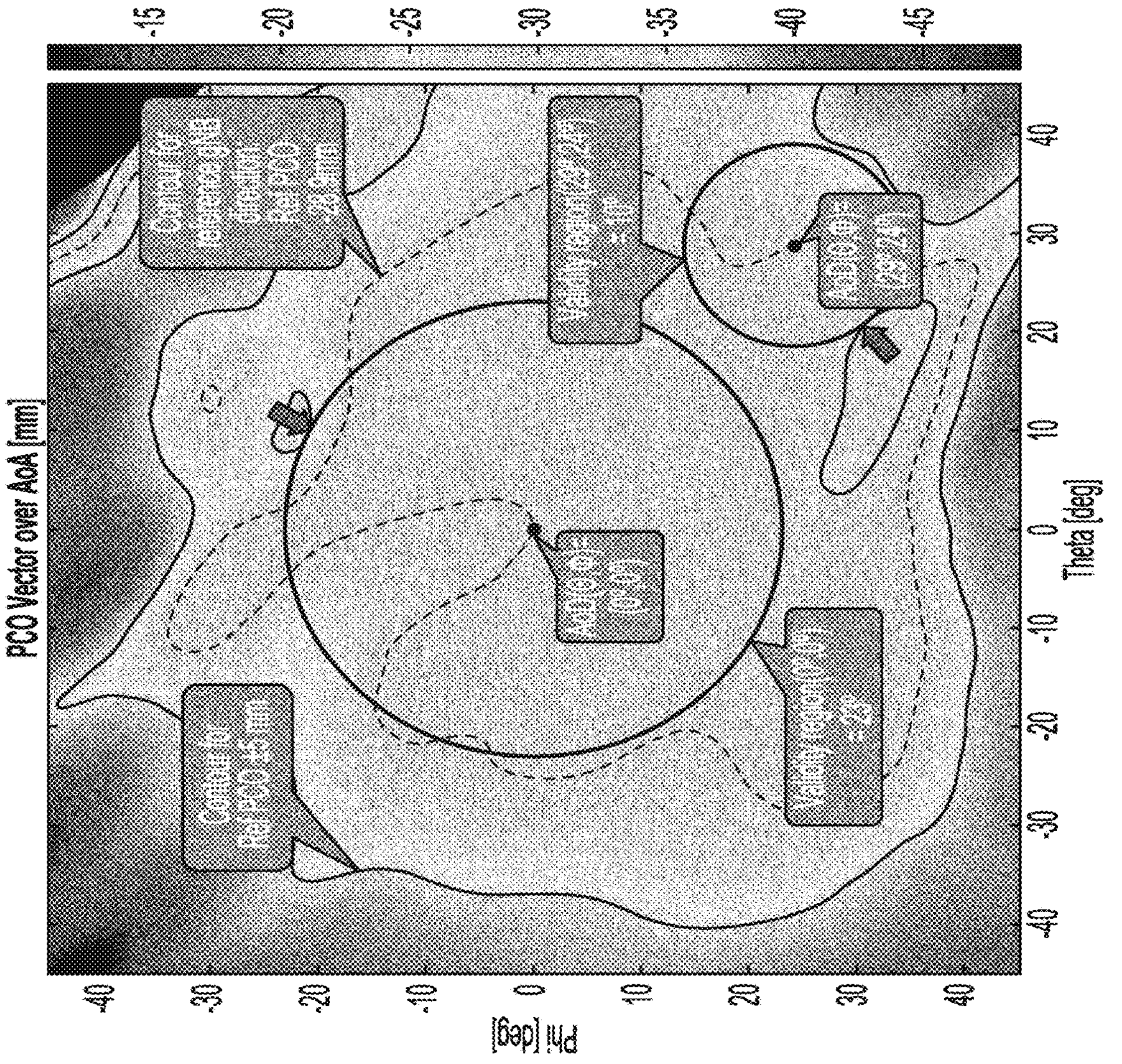
FIG. 9 illustrates an example of UE broad beam configuration PCO variation over angle of departure (AoD) with two reference network entity directions and associated validity regions.
Figure 10:
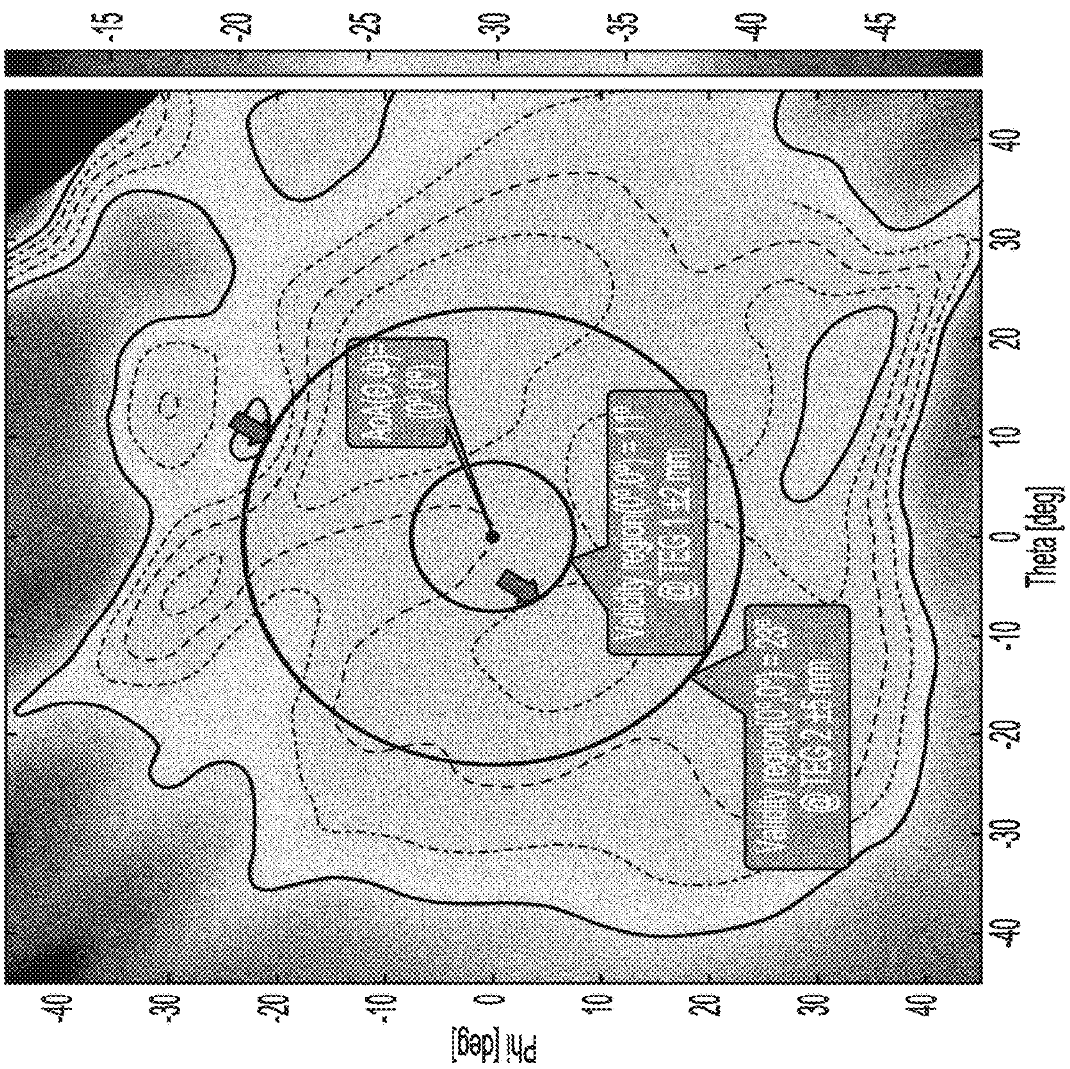
FIG. 10 illustrates an example of UE broad beam configuration PCO variation over AoD with reference gNB direction and two TEG and associated validity regions.

FIG. 9 illustrates a UE broad beam PCO vector map in mm offset with PCO_DB_TH=10 dB. The dashed line marks the contour for directions equivalent to a PCO offset of Ref_PCO=28.9 mm, while the contours for Ref PCO ±5 mm are marked with solid lines. The validity region for ±5 mm accuracy may be highly dependent on the actual direction of the reference gNB. If the reference gNB is located in direction (0,0)°, the validity region for ±5 mm accuracy is 23°, whereas if the reference gNB is located in direction (29,24)°, the validity region for ±5 mm accuracy is only 10°. FIG. 10 illustrates a similar example as depicted in FIG. 9, with the reference gNB identified in direction (0,0)°, and with the associated validity regions for a TEG 1±2 mm and TEG 2±5 mm of 11° and 23°, respectively.

Figure 11:
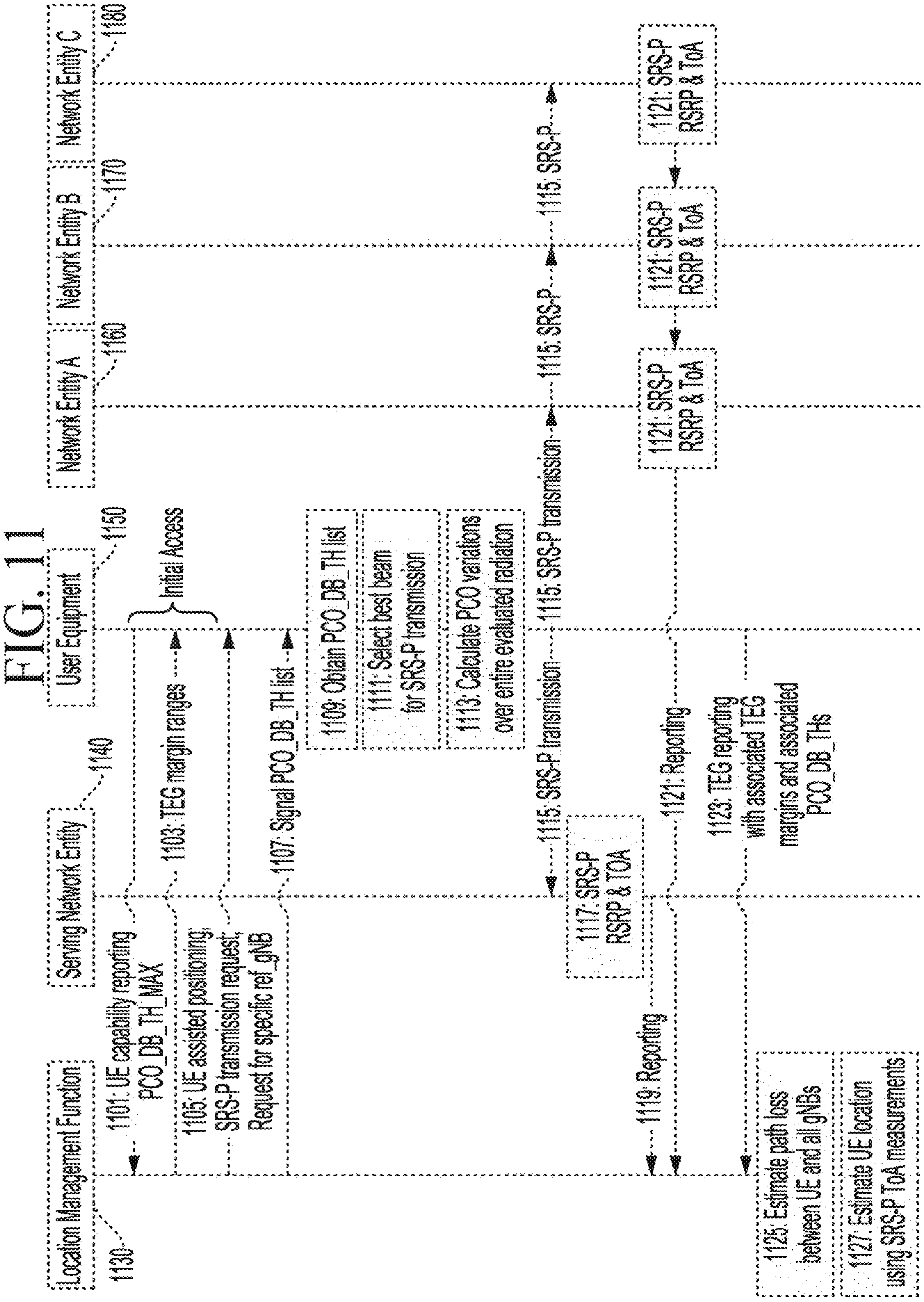
FIG. 11 illustrates an example of a signaling diagram according to certain example embodiments.

FIG. 11 illustrates an example of a signaling diagram depicting TEG reporting with angular validity indication, according to an example embodiment. In the example of FIG. 11, the UE may have no awareness of direction of any gNB. LMF 1130, serving NE 1140, UE 1150, NE A 1160, NE B 1170, and NE C 1180 may be similar to UE 2210 and NE 2220, as illustrated in FIG. 22, according to certain example embodiments.

In the example of FIG. 11, 1101-1105 may be similar to 801-805, as discussed above in FIG. 8. At 1107, LMF 1130 may transmit to UE 1150 a PCO_DB_TH list, and at 1109, UE 1150 may receive the PCO_DB_TH list.

In the example of FIG. 11, at 1111, UE 1150 may select a best beam configuration for the SRS-P transmission (narrow or wide beam). As an example, a best beam configuration may be selected by selecting the beam having the largest angular validity region and/or a beam which meets a minimum angular range for a given TEG margin. UE 1150 may also select the best beam based on received power (i.e., beam which will be strongest) and/or based on line of sight status of a given link. At 1113, UE 1150 may calculate (e.g., based on the PCO variation characterization data for the selected beam configuration) PCO variation over the entire radiation sphere (down to the specified PCO_DB_TH). Optionally, UE 1150 may compensate locally the ToD with reference to the mean PCO offset over the entire radiation sphere for positioning using relative measurements at multiple gNBs. At 1115, UE 1150 may transmit SRS-P transmissions to at least one of serving NE 1140 and NE 1160-1180. At 1117, serving NE 1140 may determine SRS-P RSRP & ToA, and report the results to LMF 1130 at 1119. At 1121, NE 1160-1180 may report SRS-P RSRP & ToA to LMF, and at 1123, UE 1150 may report TEG with associated TEG margins and associated PCO_DB_THs to LMF 1130.

Figure 12:
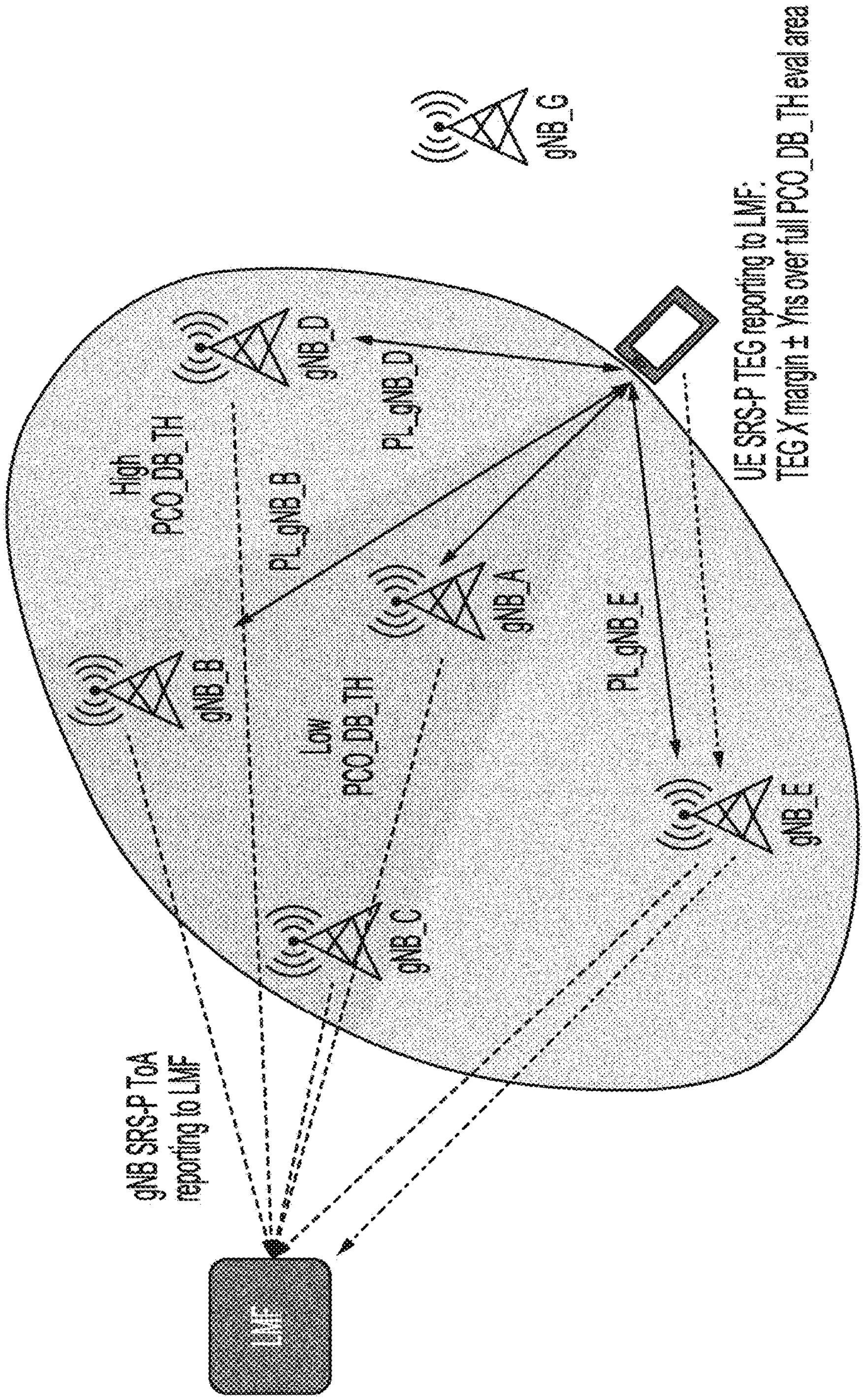
FIG. 12 illustrates an example of the proposed UE antenna PCO variation enhanced TEG reporting.

As noted above, UE 1150 may have no gNB direction awareness, and at 1123, may report the TEG margin which is valid covering the PCO variation over the entire evaluated radiation sphere as dictated by the set PCO_DB_TH to LMF 1130, as shown in FIG. 12. In certain example embodiments, UE 1150 may report more than one TEG to LMF 1130 and the reported TEGs may also be associated with different PCO_DB_TH values.

FIG. 12 shows that by decreasing PCO_DB_TH, the PCO variation may be reduced and radiation coverage area may be reduced. As a result, by choosing a high PCO_DB_TH, LMF 1130 may obtain a TEG margin report covering a large amount of gNBs but with a high margin indication (i.e., for gNB_A-E in FIG. 12). Based upon the reporting received from UE 1150, and SRS-P ToA and RSRP reporting from all gNBs, LMF 1130 may, based on gNB coordinates, rough UE location estimation, at 1125, estimate the path loss between UE 1150 and each gNB. At 1127, LMF 1130 may then compare the estimate path loss with the obtained SRS-P RSRP levels, and determine a measure of the UE antenna gain in direction of each gNB. LMF 1130 may then group gNBs in direction of high UE antenna gain (center region of FIG. 11), and may obtain a new TEG margin report based on reduced PCO_DB_TH covering this group of gNBs, thereby obtaining a tighter TEG margin indication for this subgroup.

In various example embodiments, in case the reported TEG margin is considered too high, LMF 1130 may down-select a group of gNBs based on high SRS-P RSRP, the gNB coordinates, and an initial rough UE positioning, and using this data, adjust the PCO_DB_TH accordingly. LMF 1130 may request a new SRS-P transmission with TEG report based on this reduced PCO_DB_TH, excluding gNBs outside the new evaluation area. Alternatively, LMF 1130 may request a new TEG report based on this reduced PCO_DB_TH, excluding gNBs outside the new evaluation area, but without SRS-P retransmission. This requires UE 1150 to maintain the used PCO mapping available for this subsequent LMF request. Alternatively, LMF 1130 may request TEG reports for x different PCO_DB_TH values up front, avoiding the need for any further SRS-P transmissions or additional report requests. Any of the embodiments may assume that LMF 1130 has confirmed LOS to all gNBs involved.

FIGS. 13*a-d* illustrates examples of the change in the variation of the PCO vector, for different requested PCO_DB_TH values for threshold values of 20 dB, 10 dB, 6 dB and 3 dB. The PCO vector values outside the transmit power evaluation area have been removed from the plots.

Figure 14:
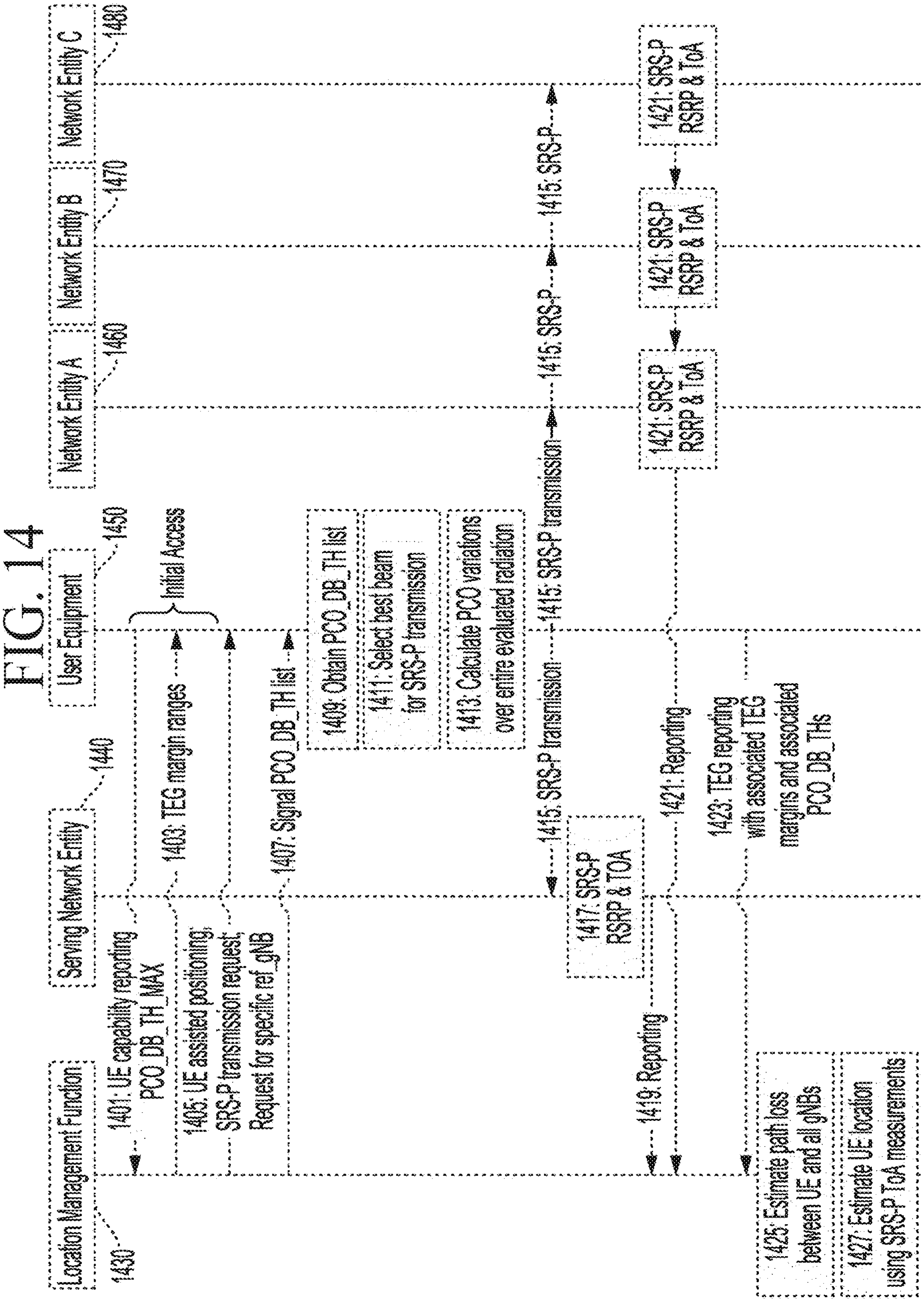
FIG. 14 illustrates an example of a signaling diagram according to certain example embodiments.

FIG. 14 illustrates an example of a signaling diagram depicting TEG reporting with angular validity indication, according to an example embodiment. In the example of FIG. 14, the UE has no gNB direction awareness within the selected beam. LMF 1430, serving NE 1440, UE 1450, NE A 1460, NE B 1470, and NE C 1480 may be similar to UE 2210 and NE 2220, as illustrated in FIG. 22, according to certain example embodiments. FIG. 14 may be similar to FIG. 13 in certain example embodiments. In the example of FIG. 14, at 1403, LMF 1430 may transmit signaling probability parameter, such as PCO_PROB, to UE 1450. At 1413, UE 1450 may calculate a TEG margin with a PCO_PROB % probability covering the PCO variation over the entire evaluated radiation sphere set by PCO_DB_TH.

Figure 15:
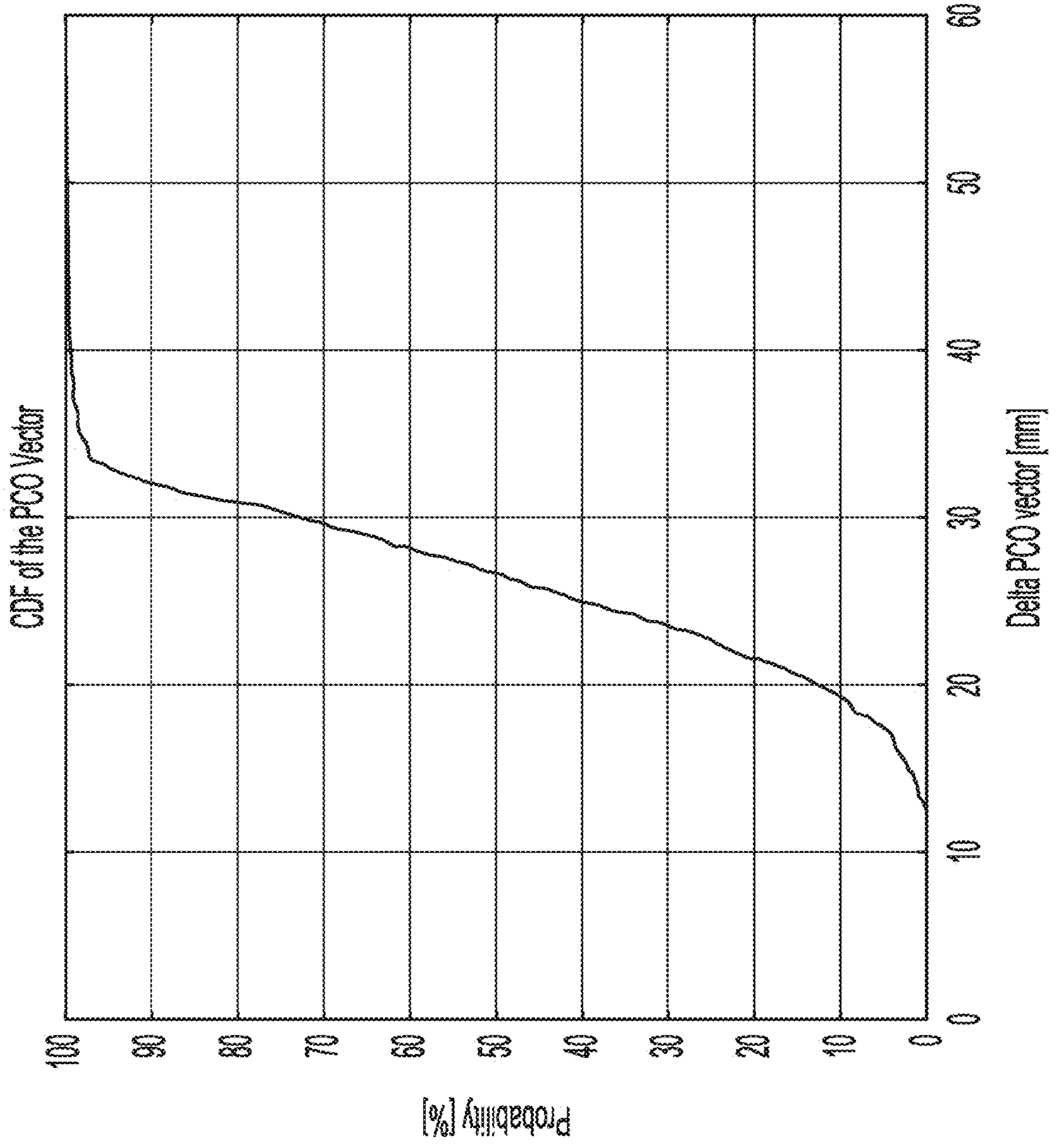
FIG. 15 illustrates an example of a cumulative distribution function (CDF) of the delta PCO vector over a full evaluated radiation sphere.

While UE 1450 may have no direction awareness of any gNB, LMF 1430 may, at 1405, additionally request UE 1450 to evaluate the full angular area as dictated by a high PCO_DB_TH, and then, at 1423, UE 1450 may report a TEG with validity over this entire evaluated radiation sphere but for a given probability PCO_PROB (e.g., 90%). In the example of FIG. 14, at 1423, UE 1450 may transmit to LMF 1430 the TEG margin and PCO_PROB which is valid covering the PCO variation over the evaluated radiation sphere set by PCO_DB_TH. The probability target PCO_PROB may be set by LMF 1430 or UE 1450. As shown in FIG. 15, the CDF curve of the PCO vector has values over the entire evaluated radiation sphere with PCO_DB_TH=20 dBError! Reference source not found., where the 90% percentile may result in a PCO vector delta of around 32 mm instead of the maximum delta of 56 mm.

Figure 16:
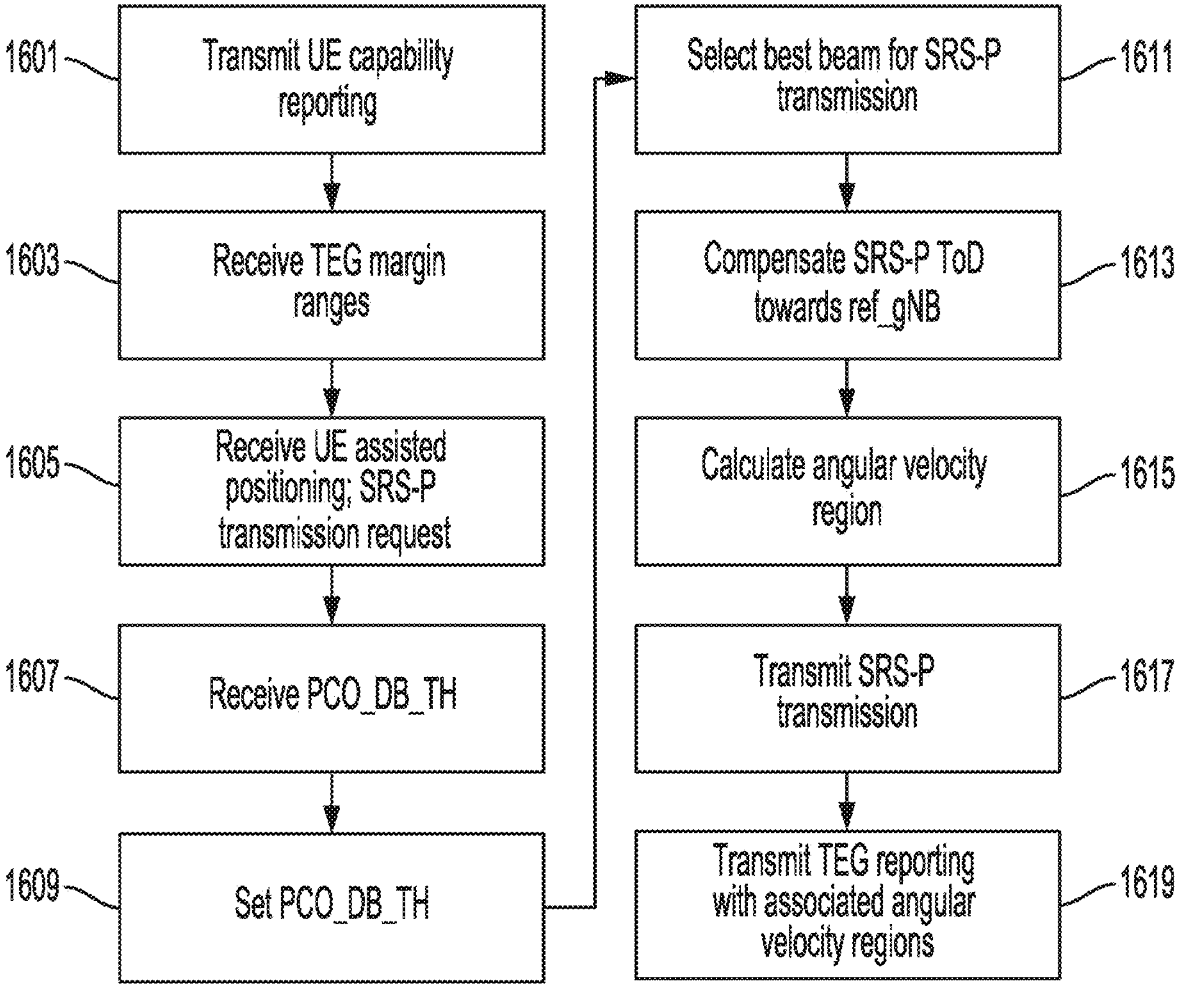
FIG. 16 illustrates an example of a flow diagram of a method according to various example embodiments.

FIG. 16 illustrates an example of a flow diagram of a method that may be performed by a UE, such as UE 2210 illustrated in FIG. 22, according to various example embodiments. As illustrated in the example of FIG. 16, at 1601, the method may include reporting PCO_DB_TH_MAX to an LMF (which may be similar to NE 2210 in FIG. 22), for example, via UE capability info to notify the LMF of a threshold maximum, which may be a maximum boundary for any UE validity region evaluation. In addition, the UE may report UE specific TEG ranges and associated certain margins to the LMF. Alternatively, at 1603, the method may include receiving TEG ranges and certain margins from the LMF.

As further illustrated in the example of FIG. 16, at 1605, the method may include receiving UE assisted positioning data, SRS-P transmission requests, and/or requests for specific ref_gNBs from the LMF. In some example embodiments, the UE may be aware of the direction of at least one reference gNB (i.e., ref_gNB). As an example, the awareness of direction of a ref _gNB may be obtained from DL AoA estimation and/or DL aligned beam configuration reused for UL. The UE may also receive a request from the LMF for a TEG report with reference to specific ref_gNBs.

In certain optional embodiments, at 1607, the method may include receiving a threshold PCO_DB_TH used at a given positioning instance from the LMF to provide adjustment flexibility, or at 1609, the method may include setting the threshold PCO_DB_TH. If PCO_DB_TH is set by the UE, it may be determined based on received power in the DL from multiple gNBs, such as NE 2220 in FIG. 22. In an example embodiment, the method may include determining that X gNBs are within PCO_DB_TH of each other in the DL, and performing the UL determination based upon X. At 1611, the method may include selecting a best beam configuration for the SRS-P transmission (e.g., narrow or wide beam), and optionally at 1613, the method may include compensating SRS-P ToD towards the ref_gNB(s) (i.e., PCO impact is cancelled in direction of the reference gNB). As an example, a best beam configuration may be selected by selecting the beam having the largest angular validity region and/or a beam which meets a minimum angular range for a given TEG margin. The UE may also select the best beam based on received power (i.e., beam which will be strongest) and/or based on line of sight status of a given link.

As illustrated in the example of FIG. 16, at 1615, the method may include calculating (for example, based on the PCO variation characterization data for the selected beam configuration) an angular validity region around the reference gNB direction for which the different TEGs are still valid. In various example embodiments, this may be a worst-case angular region in degrees around the reference gNB direction for which the TEG is still valid. If the orientation of the UE relative to the receiving gNBs is known, then the angular validity region could be enhanced to reporting angles separately for Θ and Φ directions. In addition, angular validity region reporting may also include regions with likelihood of being within the specified TEG of less than 100% (e.g., 90%) to enlarge the validity region.

As also illustrated in the example of FIG. 16, at 1617, the method may include transmitting SRS-P transmissions to a serving NE (such as NE 2220 in FIG. 22), as well as the NEs. At 1619, the method may include reporting at least one TEG with associated validity region and ref_gNB ID to the LMF. It may be beneficial for the UE to report more than one TEG to enable the LMF to evaluate accuracy degradation for gNBs outside the validity region of the at least one TEG. The reported TEGs may also be associated with multiple PCO_DB_TH values.

Figure 17:
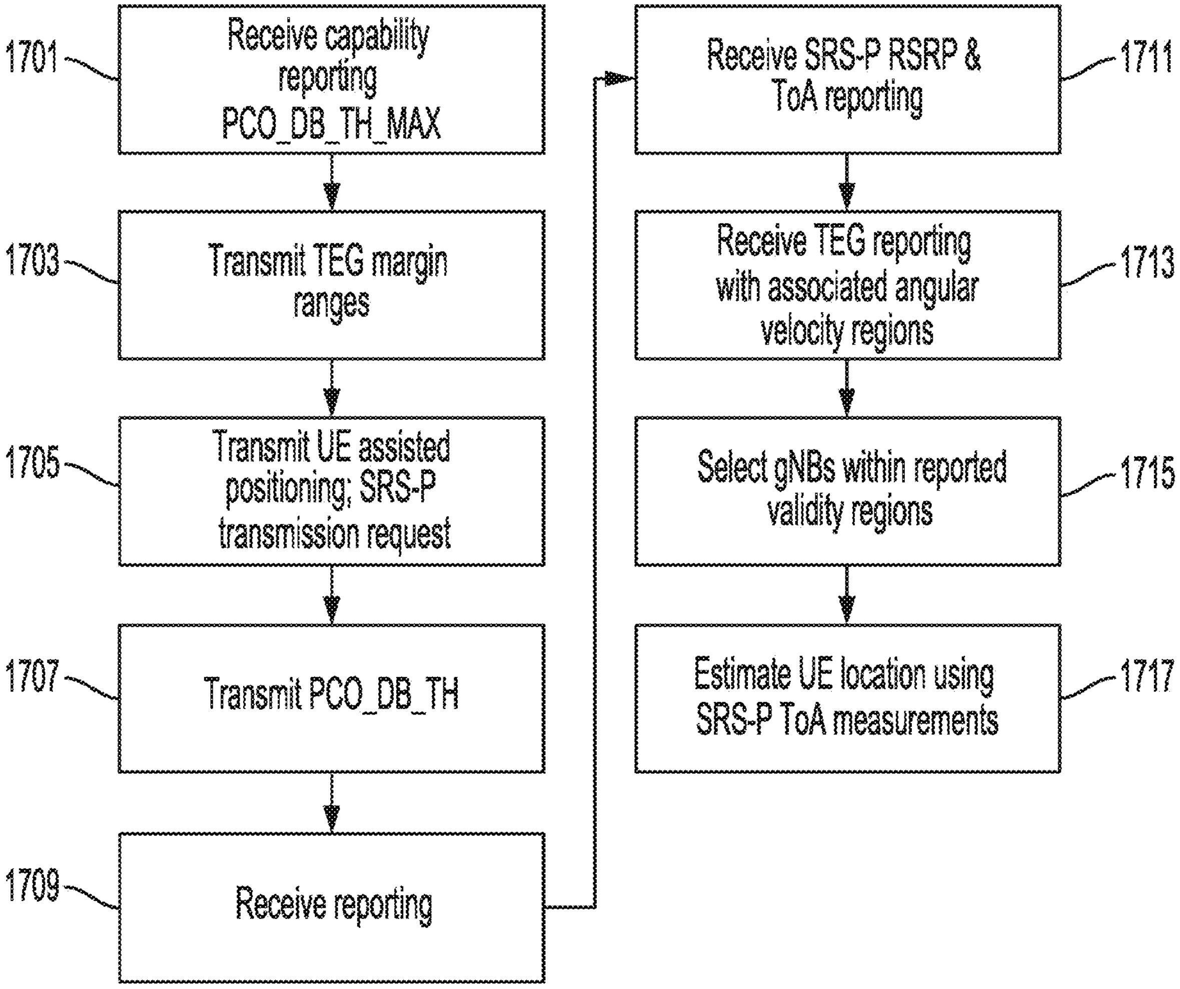
FIG. 17 illustrates an example of a flow diagram of a method according to some example embodiments.

FIG. 17 illustrates an example of a flow diagram of a method that may be performed by a LMF, such as NE 2220 illustrated in FIG. 22, according to various example embodiments. As illustrated in the example of FIG. 17, at 1701, the method may include receiving PCO_DB_TH_MAX from a UE (such as UE 2210 in FIG. 22), for example, via UE capability info to notify the LMF of a threshold maximum, which may be a maximum boundary for any UE validity region evaluation. In addition, the method may include receiving UE specific TEG ranges and associated certain margins from the UE. Alternatively, at 1703, the method may include transmitting TEG ranges and certain margins to the UE.

As further illustrated in the example of FIG. 17, at 1705, the method may include transmitting UE assisted positioning data, SRS-P transmission requests, and/or requests for specific ref_gNBs to the UE. In some example embodiments, the UE may be aware of the direction of at least one reference gNB (i.e., ref_gNB). As an example, the awareness of direction of a ref_gNB may be obtained from DL AoA estimation and/or DL aligned beam configuration reused for UL. The method may include requesting a TEG report with reference to specific ref_gNBs.

In certain optional embodiments, at 1707, the method may include transmitting a threshold PCO_DB_TH used at a given positioning instance to the UE to provide adjustment flexibility. At 1709, the method may include receiving SRS-P RSRP & TOA results from the serving NE. At 1711, the method may include receiving SRS-P RSRP & TOA results. At 1713, the method may include receiving at least one TEG with associated validity region and ref_gNB ID from the UE. It may be beneficial to receive more than one TEG to enable the LMF to evaluate accuracy degradation for gNBs outside the validity region of the at least one TEG. The reported TEGs may also be associated with multiple PCO_DB_TH values.

As illustrated in the example of FIG. 17, at 1715, the method may include selecting any of NE 860-880, and at 1717, use approximate locations of the UE and the known locations of the selected NE to determine which measurements fall within the at least one reported validity region. That is, the LMF may select positioning measurements from NEs that are within the indicated angular validity region. For example, the LMF may use SRS-P measurements from those NEs that are determined to be within the at least one validity region, wherein the using comprises determining position of the UE based on the selected measurements.

Figure 18:
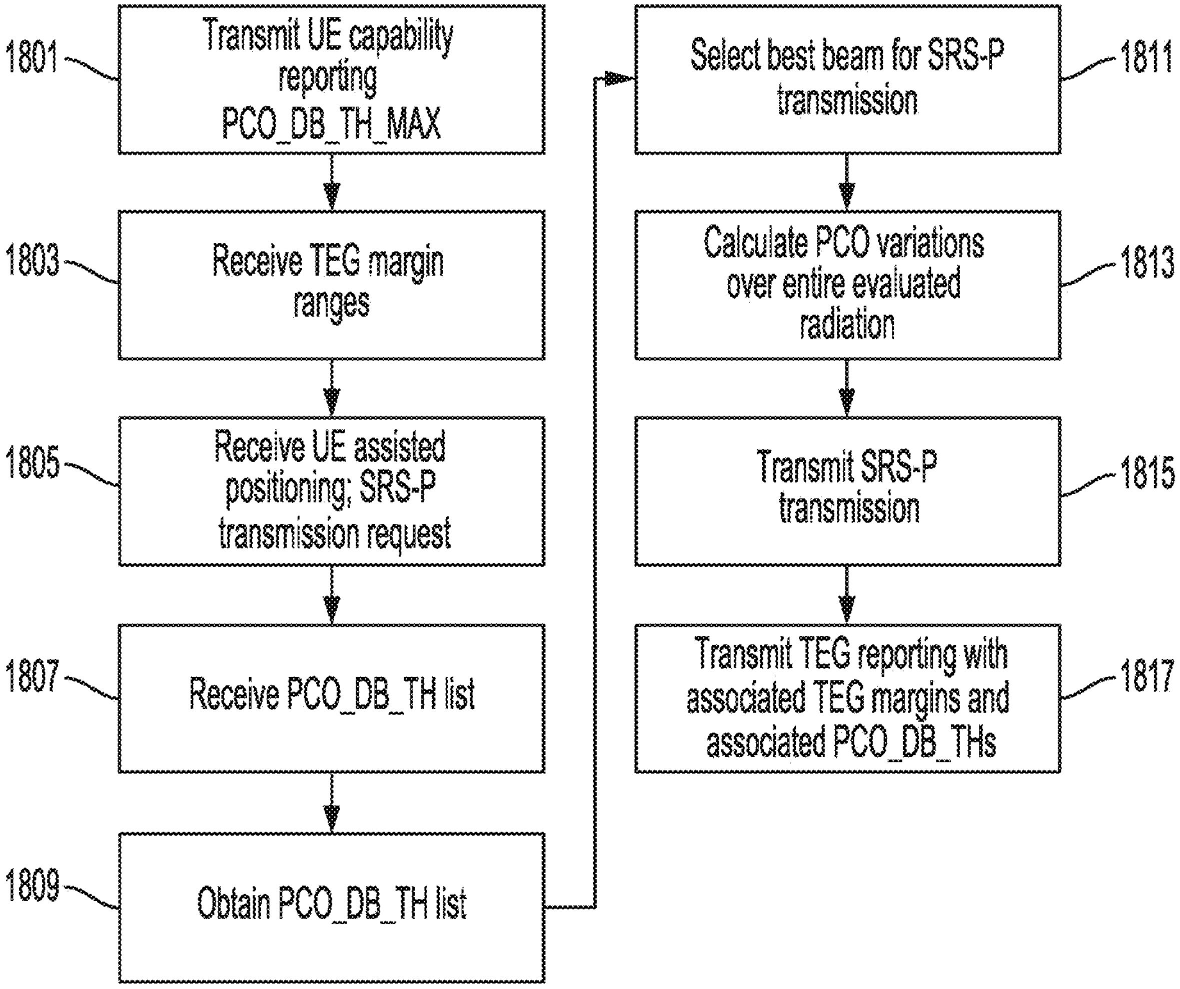
FIG. 18 illustrates an example of a flow diagram of a method according to certain example embodiments.

FIG. 18 illustrates an example of a flow diagram of a method that may be performed by a UE, such as UE 2210 illustrated in FIG. 22, according to various example embodiments. In the example of FIG. 18, 1801-1807 may be similar to 1601-1607, as discussed above in FIG. 16. As illustrated in the example of FIG. 18, at 1807, the method may include receiving a PCO_DB_TH list, and at 1809, the method may include setting the PCO_DB_TH.

As illustrated in the example of FIG. 18, at 1811, the method may include selecting a best beam configuration for the SRS-P transmission (narrow or wide beam). As an example, a best beam configuration may be selected by selecting the beam having the largest angular validity region and/or a beam which meets a minimum angular range for a given TEG margin. The UE may also select the best beam based on received power (i.e., beam which will be strongest) and/or based on line of sight status of a given link. At 1813, the method may include calculating (e.g., based on the PCO variation characterization data for the selected beam configuration) PCO variation over the entire radiation sphere (down to the specified PCO_DB_TH). Optionally, the method may include compensating locally the ToD with reference to the mean PCO offset over the entire radiation sphere for positioning using relative measurements at multiple gNBs. At 1815, the method may include transmitting SRS-P transmissions to at least one of the serving NE and the reference NEs. At 1817, the method may include reporting TEG with associated TEG margins and associated PCO_DB_THs to the LMF.

As noted above, the UE may have no gNB direction awareness, and the method may include reporting the TEG margin, which is valid covering the PCO variation over the entire evaluated radiation sphere as dictated by the set PCO_DB_TH to the LMF, as shown in FIG. 12. In certain example embodiments, the method may include reporting more than one TEG to the LMF, and the reported TEGs may also be associated with different PCO_DB_TH values.

Figure 19:
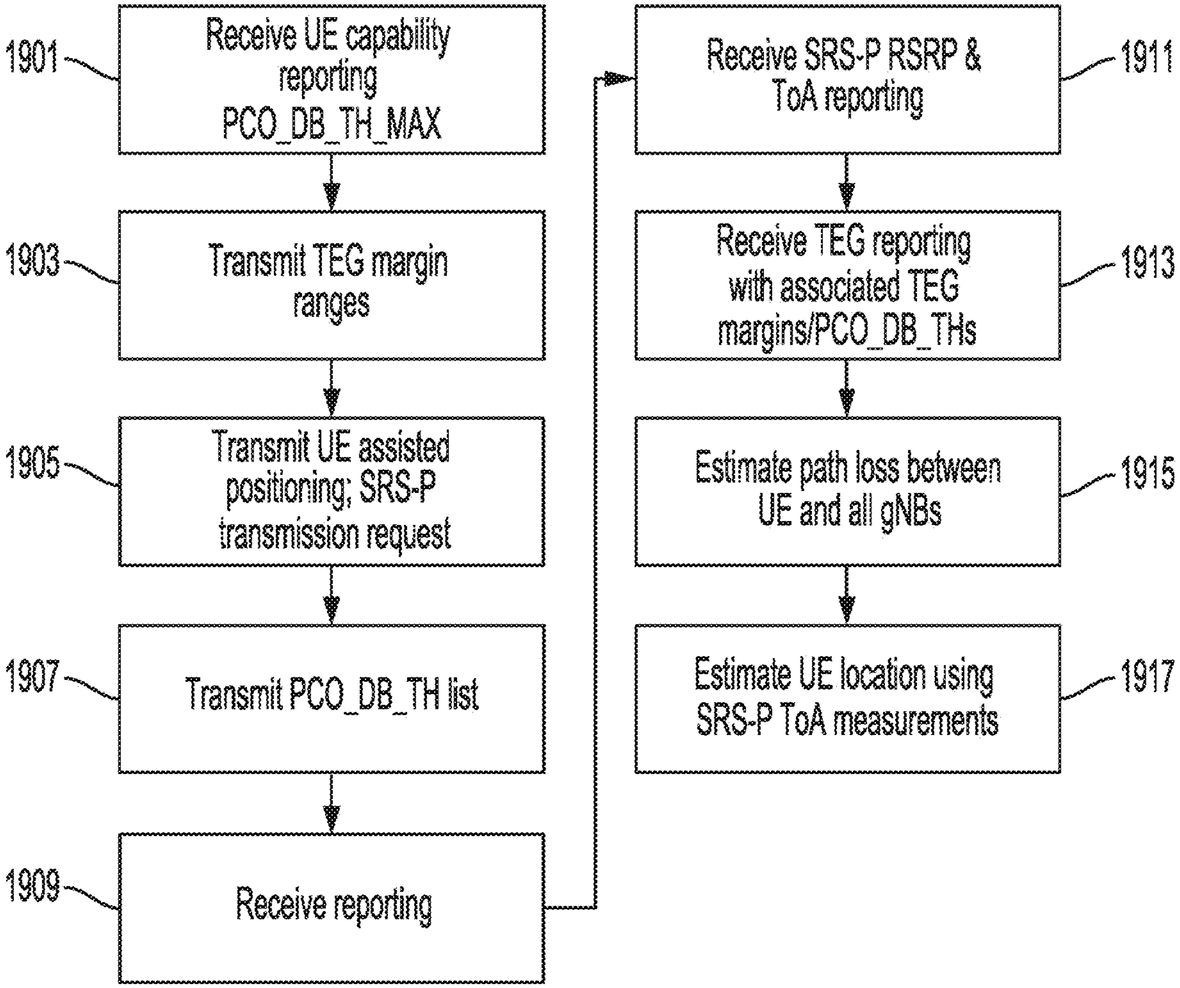
FIG. 19 illustrates an example of a flow diagram of a method according to various example embodiments.

FIG. 19 illustrates an example of a flow diagram of a method that may be performed by an LMF, such as NE 2220 illustrated in FIG. 22, according to various example embodiments. In the example of FIG. 19, 1901-1905 may be similar to 1601-1607, as discussed above in FIG. 16. As illustrated in the example of FIG. 19, at 1907, the method may include transmitting to a UE a PCO_DB_TH list. At 1909, the method may include receiving SRS-P RSRP & ToA results from a serving NE. At 1911, the method may include receiving SRS-P RSRP & ToA results from the reference NEs. At 1913, the method may include receiving TEG with associated TEG margins and associated PCO_DB_THs from the UE.

As noted above, the UE may have no gNB direction awareness, and the method may include receiving the TEG margin which is valid covering the PCO variation over the entire evaluated radiation sphere as dictated by the set PCO_DB_TH, as shown in FIG. 12. In certain example embodiments, the method may include receiving more than one TEG from the UE, and the reported TEGs may also be associated with different PCO_DB_TH values.

FIG. 13*a*-d show that by decreasing PCO_DB_TH, the PCO variation may be reduced and radiation coverage area may be reduced. As a result, by choosing a high PCO_DB_TH, the method may include receiving a TEG margin report covering a large amount of gNBs but with a high margin indication (i.e., for gNB_A-E in FIG. 12). Based upon the reporting received from the UE, and SRS-P ToA and RSRP reporting from all gNBs, at 1917 in the example of FIG. 19, the method may include may include, based on gNB coordinates and rough UE location estimation, estimating the path loss between the UE and each gNB. The method may further include comparing the estimate path loss with the obtained SRS-P RSRP levels, and determining a measure of the UE antenna gain in direction of each gNB. The method may include grouping gNBs in direction of high UE antenna gain (center region of FIG. 11), and may obtain a new TEG margin report based on reduced PCO_DB_TH covering this group of gNBs, thereby obtaining a tighter TEG margin indication for this sub-group.

In various example embodiments, in case the reported TEG margin is considered too high, the method may include down-selecting a group of gNBs based on high SRS-P RSRP, the gNB coordinates, and an initial rough UE positioning, and using this data, adjust the PCO_DB_TH accordingly. The method may include requesting a new SRS-P transmission with TEG report based on this reduced PCO_DB_TH, excluding gNBs outside the new evaluation area. Alternatively, the method may include requesting a new TEG report based on this reduced PCO_DB_TH, excluding gNBs outside the new evaluation area, but without SRS-P retransmission. This requires the UE to maintain the used PCO mapping available for this subsequent LMF request. Alternatively, the method may include requesting TEG reports for x different PCO_DB_TH values up front, avoiding the need for any further SRS-P transmissions or additional report requests. Any of the embodiments may assume that the LMF has confirmed LOS to all gNBs involved.

Figure 20:
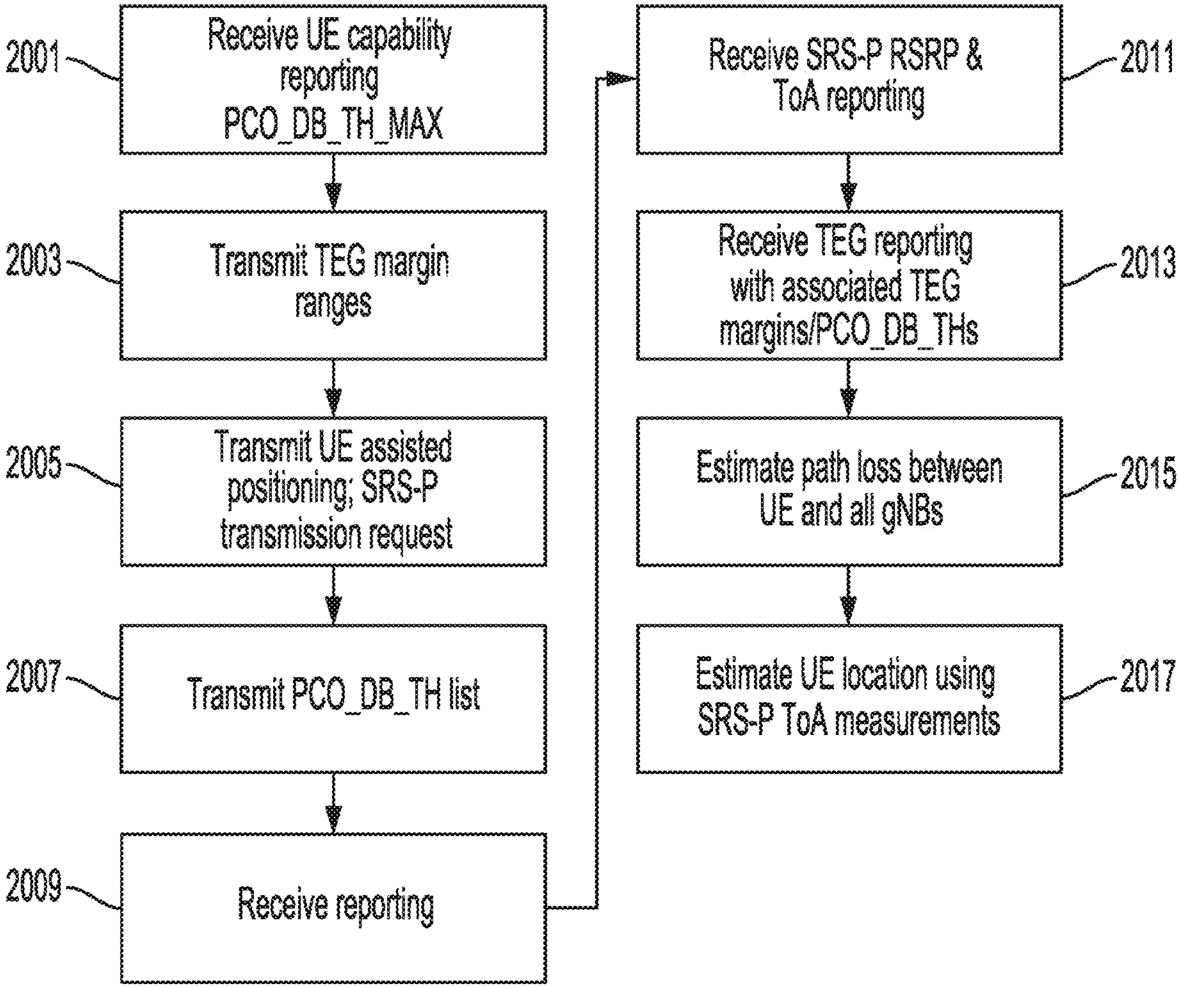
FIG. 20 illustrates an example of a flow diagram of a method according to some example embodiments.

FIG. 20 illustrates an example of a flow diagram of a method that may be performed by a UE, such as UE 2210 illustrated in FIG. 22, according to various example embodiments. In the example of FIG. 20, 2001-2005 may be similar to 1801-1805, as discussed above in FIG. 18. As illustrated in the example of FIG. 20, at 2003, the method may also include receiving probability parameter PCO_PROB. At 2007, the method may include receiving a PCO_DB_TH list, and at 2009, the method may include obtaining the PCO_DB_TH list.

As illustrated in the example of FIG. 20, at 2011, the method may include selecting a best beam configuration for the SRS-P transmission (narrow or wide beam). As an example, a best beam configuration may be selected by selecting the beam having the largest angular validity region and/or a beam which meets a minimum angular range for a given TEG margin. The UE may also select the best beam based on received power (i.e., beam which will be strongest) and/or based on line of sight status of a given link. At 2013, the method may include calculating (e.g., based on the PCO variation characterization data for the selected beam configuration) PCO variation over the entire radiation sphere (down to the specified PCO_DB_TH). In addition, the method may include calculating of the TEG margin with a PCO_PROB % probability covering the PCO variation over the entire evaluated radiation sphere set by PCO_DB_TH.

Optionally, the method may include compensating locally the ToD with reference to the mean PCO offset over the entire radiation sphere for positioning using relative measurements at multiple gNBs. At 2015, the method may include transmitting SRS-P transmissions to at least one of the serving NE and the reference NEs.

As noted above, the UE may have no gNB direction awareness, and the method may include, at 2017, reporting the TEG margin which is valid covering the PCO variation over the entire evaluated radiation sphere as dictated by the set PCO_DB_TH to the LMF, as shown in FIG. 12. In certain example embodiments, the method may include reporting more than one TEG to the LMF, and the reported TEGs may also be associated with different PCO_DB_TH values. The method may include reporting the TEG margin and PCO_PROB which is valid covering the PCO variation over the evaluated radiation sphere set by PCO_DB_TH.

Figure 21:
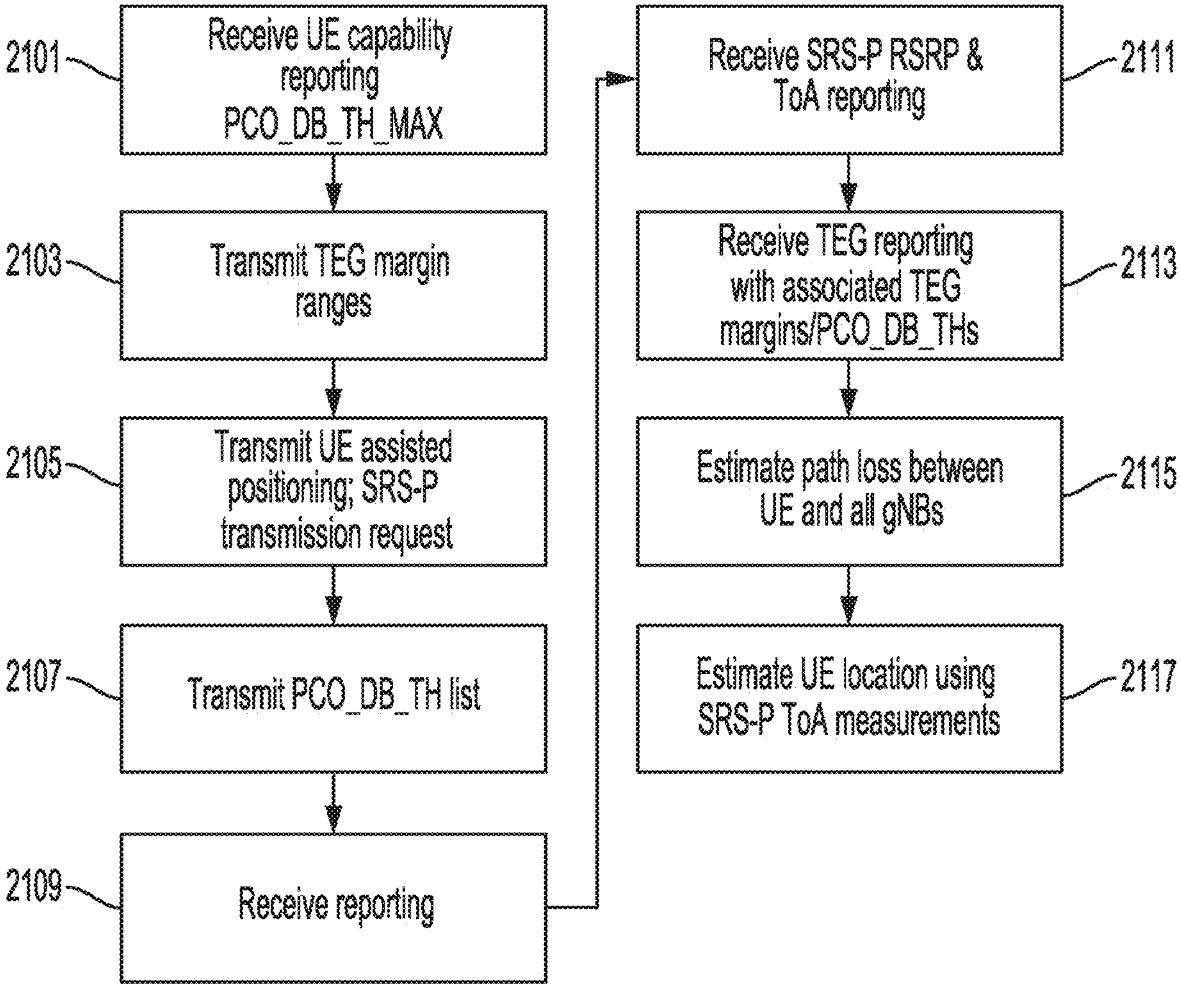
FIG. 21 illustrates an example of a flow diagram of a method according to certain example embodiments.

FIG. 21 illustrates an example of a flow diagram of a method that may be performed by a LMF, such as NE 2210 illustrated in FIG. 22, according to various example embodiments. In the example of FIG. 21, 2101-2105 may be similar to 1801-1805, as discussed above in FIG. 18. At 2103, the method may also include transmitting probability parameter PCO_PROB. As illustrated in the example of FIG. 21, at 2107, the method may include transmitting a PCO_DB_TH list. At 2109, the method may include receiving SRS-P transmissions to at least one of the serving NE and the reference NEs.

As noted above, the UE may have no gNB direction awareness, and the method may include, at 2111, receiving the TEG margin which is valid covering the PCO variation over the entire evaluated radiation sphere as dictated by the set PCO_DB_TH to the LMF, as shown in FIG. 12. In certain example embodiments, the method may include receiving more than one TEG from the UE, and the reported TEGs may also be associated with different PCO_DB_TH values. The method may include reporting the TEG margin and PCO_PROB which is valid covering the PCO variation over the evaluated radiation sphere set by PCO_DB_TH.

While the UE may have no direction awareness of any gNB, the method may include, at 2103, additionally request the UE to evaluate the full angular area as dictated by a high PCO_DB_TH, and then, at 2113, the method may include receiving a TEG with validity over this entire evaluated radiation sphere but for a given probability PCO_PROB (e.g., 90%).

FIGS. 13*a-d* show that by decreasing PCO_DB_TH, the PCO variation may be reduced and radiation coverage area may be reduced. As a result, by choosing a high PCO_DB_TH, the method may include obtaining a TEG margin report covering a large amount of gNBs but with a high margin indication (i.e., for gNB_A-E in FIG. 12). Based upon the reporting received from the UE, and SRS-P ToA and RSRP reporting from all gNBs, the method may include, based on gNB coordinates, rough UE location estimation, at 2115, estimating the path loss between the UE and each gNB. At 2117, the method may include comparing the estimate path loss with the obtained SRS-P RSRP levels, and determine a measure of the UE antenna gain in direction of each gNB. The LMF may then group gNBs in direction of high UE antenna gain (center region of FIG. 11), and may obtain a new TEG margin report based on reduced PCO_DB_TH covering this group of gNBs, thereby obtaining a tighter TEG margin indication for this sub-group.

FIG. 22 illustrates an example of a system according to certain example embodiments. In one example embodiment, a system may include multiple devices, such as, for example, UE 2210 and/or NE 2220.

UE 2210 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 2220 may be one or more of a base station, such as an eNB or gNB, a serving gateway, a server, and/or any other access node or combination thereof. Furthermore, UE 2210 and/or NE 2220 may be one or more of a citizens broadband radio service device (CBSD).

In some embodiments, NE 2220 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 2210 and/or NE 2220 may include at least one processor, respectively indicated as 2211 and 2221. Processors 2211 and 2221 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 2212 and 2222. The memory may be fixed or removable. The memory may include computer program instructions or computer code contained therein. Memories 2212 and 2222 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 2211 and 2221, memories 2212 and 2222, and any subset thereof, may be configured to provide means corresponding to the various blocks of FIGS. 8-21. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 22, transceivers 2213 and 2223 may be provided, and one or more devices may also include at least one antenna, respectively illustrated as 2214 and 2224. The device may have many antennas, such as an array of antennas configured for multiple input multiple output (MIMO) communications, or multiple antennas for multiple RATs. Other configurations of these devices, for example, may be provided. Transceivers 2213 and 2223 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 8-21). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 8-21. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 23:
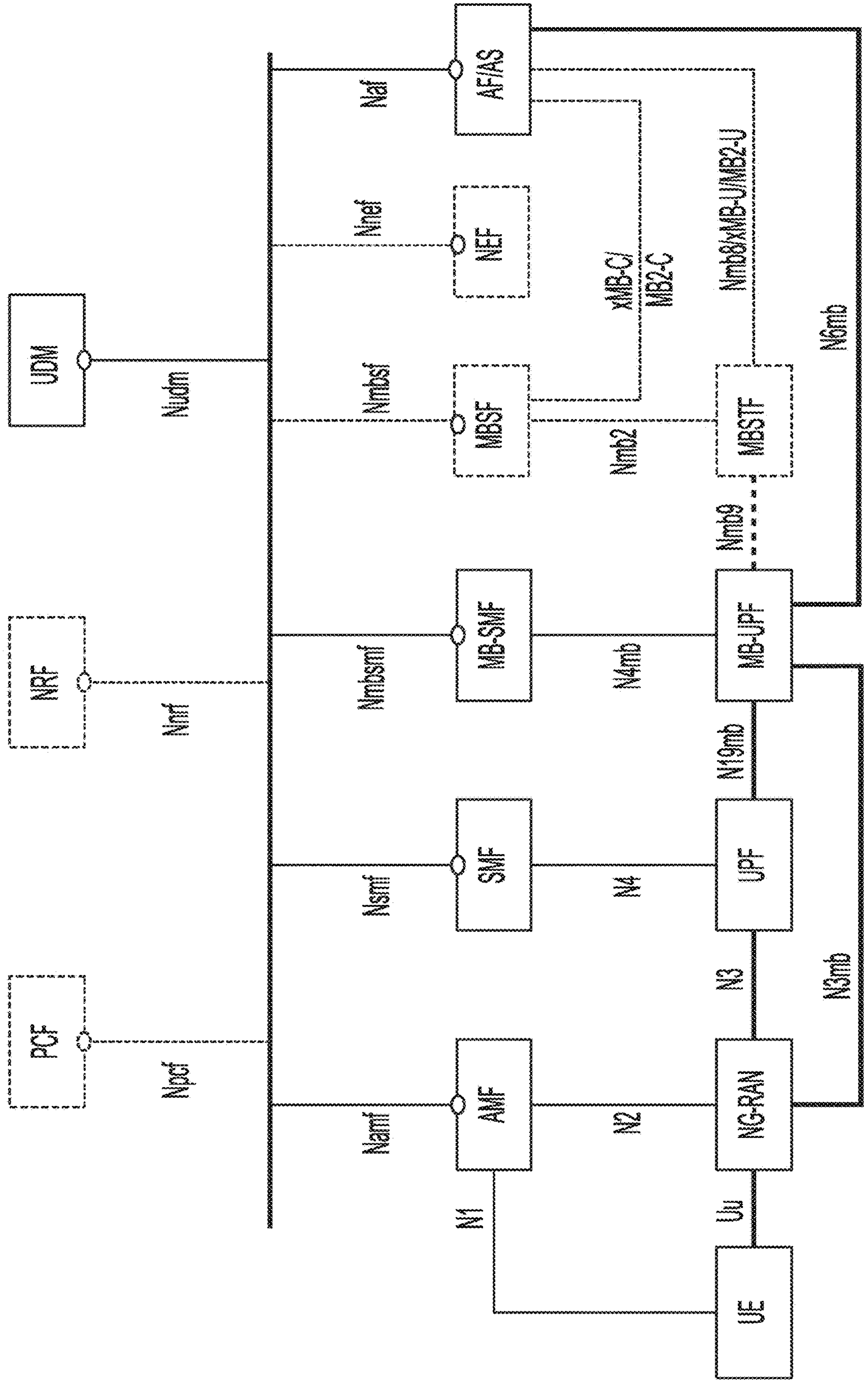
FIG. 23 illustrates an example of a 5G network and system architecture according to certain example embodiments.

FIG. 23 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The UE and NE illustrated in FIG. 22 may be similar to UE 2210 and NE 2220, respectively. The user plane function (UPF) may provide services such as intra-RAT and inter-RAT mobility, routing and forwarding of data packets, inspection of packets, user plane quality of service (QOS) processing, buffering of downlink packets, and/or triggering of downlink data notifications. The application function (AF) may primarily interface with the core network to facilitate application usage of traffic routing and interact with the policy framework.

According to certain example embodiments, processor 2211 and memory 2212 may be included in or may form a part of processing circuitry or control circuitry. In addition, in some example embodiments, transceiver 513 may be included in or may form a part of transceiving circuitry.

In some example embodiments, an apparatus (e.g., apparatus 2210 and/or apparatus 2220) may include means for performing a method, a process, or any of the variants discussed herein. Examples of the means may include one or more processors, memory, controllers, transmitters, receivers, and/or computer program code for causing the performance of the operations.

In an embodiment, there is provided a non-transitory computer-readable medium comprising program instructions stored thereon for performing: calculating an angular validity region around a reference direction for which at least one timing error group is valid; and transmitting at least one of the timing error groups comprising an indication about the angular validity region and a reference direction identifier associated with the reference direction to a location management node.

In an example, the non-transitory computer-readable medium further comprises program instructions stored thereon for performing: determining a likelihood of the at least one of the timing error groups to be valid within the angular validity region; and transmitting the likelihood to a location management node.

In an example, the non-transitory computer-readable medium further comprises program instructions stored thereon for performing: transmitting, to the location management node, at least one user equipment capability associated with a maximum antenna delta gain supported by the user equipment for phase center offset variation assessment.

In an example, the non-transitory computer-readable medium further comprises program instructions stored thereon for performing: setting an antenna delta gain threshold for phase center offset variation assessment, wherein the antenna delta gain threshold is smaller than or equal to maximum antenna delta gain supported by the user equipment for phase center offset variation assessment.

In an example, the reference direction identifier is a reference base station.

In an example, the calculating the angular validity region is based at least on phase center offset variation assessment.

In an example, each of the at least one timing error groups comprise a timing error group range and a timing error group margin.

In an example, the antenna delta gain threshold is set by the user equipment.

In an example, the antenna delta gain threshold is signaled by the location management node to the user equipment.

In an example, the non-transitory computer-readable medium further comprises program instructions stored thereon for performing: selecting, by the user equipment, at least one best beam configuration associated with a sounding reference signal positioning transmission.

In an embodiment, there is provided a non-transitory computer-readable medium comprising program instructions stored thereon for performing: receiving at least one timing error group comprising an indication about an angular validity region and a reference direction identifier associated with the reference direction from a user equipment.

In an example, the non-transitory computer-readable medium further comprises program instructions stored thereon for performing: receiving, from the user equipment, at least one user equipment capability associated with a maximum antenna delta gain supported by the user equipment for phase center offset variation assessment; and transmitting an antenna delta gain threshold for phase center offset variation assessment to the user equipment, wherein the antenna delta gain threshold is smaller than or equal to the maximum antenna delta gain.

In an example, the non-transitory computer-readable medium further comprises program instructions stored thereon for performing: selecting at least one reference base station located within the angular validity region based upon the timing error group report.

In an example, the at least one timing error group comprises a timing error group range and a timing error group margin.

In an example, an antenna delta gain threshold for phase center offset variation assessment is set by the user equipment.

In an example, an antenna delta gain threshold for phase center offset variation assessment is set by the location management node.

In an example, the non-transitory computer-readable medium further comprises program instructions stored thereon for performing: selecting, by the location management node, based upon an approximate location of the user equipment and at least one base station, which of positioning measurements within the angular validity region.

In an embodiment, there is provided a non-transitory, computer-readable medium comprising program instructions stored thereon for performing: transmitting at least one user equipment capability associated with a maximum antenna delta gain supported by a user equipment for phase center offset variation assessment to a location management node; receiving a list of antenna delta gain thresholds; calculating at least one timing error group margin covering phase center offset variations associated with an entire evaluated radiation sphere of the list of antenna delta gain thresholds; and transmitting at least one timing error group associated with timing error group margins and the list of antenna delta gain thresholds to the location management node.

In an embodiment, there is provided a non-transitory, computer-readable medium comprising program instructions stored thereon for performing: receiving at least one user equipment capability associated with a maximum antenna delta gain supported by a user equipment for phase center offset variation assessment from the user equipment; transmitting a list of antenna delta gain thresholds to the user equipment; and receiving at least one timing error group associated with timing error group margins and the list of antenna delta gain thresholds to the location management node.

In an example, the non-transitory computer-readable medium further comprises program instructions stored thereon for performing: estimating path loss between the user equipment and at least one reference base station.

In an embodiment, there is provided a non-transitory, computer-readable medium comprising program instructions stored thereon for performing: transmitting at least one user equipment capability associated with a probability parameter to a location management node; receiving a list of antenna delta gain thresholds; calculating a timing error group margin associated with a probability parameter of a phase center offset variation over an entire evaluated radiation sphere; and transmitting at least one timing error group associated with timing error group margins and the list of antenna delta gain thresholds to the location management node.

In an embodiment, there is provided a non-transitory, computer-readable medium comprising program instructions stored thereon for performing: receiving at least one user equipment capability associated with a probability parameter from a user equipment; transmitting a list of antenna delta gain thresholds to the user equipment; and receiving at least one timing error group associated with timing error group margins and the list of antenna delta gain thresholds to the location management node.

In an example, the non-transitory computer-readable medium further comprises program instructions stored thereon for performing: estimating path loss between the user equipment and at least one reference base station.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP Third Generation Partnership Project
5G Fifth Generation
5GC Fifth Generation Core
5GS Fifth Generation System
ASIC Application Specific Integrated Circuit
CBSD Citizens Broadband Radio Service Device
CCCH Common Control Channel
CDF Cumulative Distribution Function
CE Control Elements
CG Configured Grant
CN Core Network
CM Configuration Management
CPU Central Processing Unit
DL Downlink
DL-AoD Downlink Angle of Departure
DL-TDOA Downlink Time Difference of Arrival
DMRS Demodulation Reference Signal
DRB Data Radio Bearer
eMBB Enhanced Mobile Broadband
eMTC Enhanced Machine Type Communication
eNB Evolved Node B
eOLLA Enhanced Outer Loop Link Adaptation
EPS Evolved Packet System
FDD Frequency Division Duplex
FR Frequency Range
gNB Next Generation Node B
GPS Global Positioning System
HARQ Hybrid Automatic Repeat Request
HARQ PID Hybrid Automatic Repeat Request Process Identifier
HDD Hard Disk Drive
IEEE Institute of Electrical and Electronics Engineers
IMSI International Mobile Subscriber Identity
IoT Internet of Things
IPTV Internet Protocol Television
L1 Layer 1
L2 Layer 2
LBT Listen Before Talk
LCH Logical Channel
LCP Logical Channel Prioritization
LMF Location Management Function
LTE Long-Term Evolution
LTE-A Long-Term Evolution Advanced
MAC Medium Access Control
MBS Multicast and Broadcast Systems
MC Multicast
MCS Modulation and Coding Scheme
MEMS Micro Electrical Mechanical System
MIB Master Information Block
MIMO Multiple Input Multiple Output
MME Mobility Management Entity
mMTC Massive Machine Type Communication
MPDCCH Machine Type Communication Physical Downlink Control Channel
MTC Machine Type Communication
Multi-RTT Multi-cell Round Trip Time
NACK Negative Acknowledgement
NAS Non-Access Stratum
NB-IOT Narrowband Internet of Things
NE Network Entity
NG Next Generation
NG-eNB Next Generation Evolved Node B
NG-RAN Next Generation Radio Access Network
NR New Radio
NR-U New Radio Unlicensed
ns Nanosecond
OFDM Orthogonal Frequency Division Multiplexing
OLLA Outer Loop Link Adaptation
PC-ABS Polycarbonate Acrylonitrile Butadiene Styrene
PCO Phase Center Offset
PDA Personal Digital Assistance
PDCCH Physical Downlink Control Channel
PDSCH Physical Downlink Shared Channel
PDU Protocol Data Unit
PHY Physical
PO Paging Occasion
PQI Packet Quality of Service Identifier
PRACH Physical Random Access Channel
PRB Physical Resource Block
PRS Positioning Reference Signal
P-RNTI Paging Radio Network Temporary Identifier
PTM Point-to-Multipoint
PTP Point-to-Point
PUCCH Physical Uplink Control Channel
PUSCH Physical Uplink Shared Channel
QCI Quality of Service Class Identifier
QFI Quality of Service Flow Identifier
QOS Quality of Service
RAM Random Access Memory
RAN Radio Access Network
RAT Radio Access Technology
RE Resource Element
RLC Radio Link Control
RNTI Radio Network Temporary Identifier
RRC Radio Resource Control
RS Reference Signal
RSRP Reference Signal Received Power
RSTD Reference Signal Time Difference
SC-PTM Single Cell-Point-to-Multipoint
SDU Service Data Unit
SFN System Frame Number
SIB System Information Block
SMF Session Management Function
SR Scheduling Report
SRB Signaling Radio Bearer
SRS-P Sounding Reference Signal-Positioning
SSB Synchronization Signal Block
TB Transport Block
TDD Time Division Duplex
TEG Timing Error Group
ToA Time of Arrival
ToD Time of Departure
UE User Equipment
UL Uplink
UL-AoA Uplink Angle of Arrival
UL-TDOA Uplink Time Difference of Arrival
UMTS Universal Mobile Telecommunications System
UPF User Plane Function
URLLC Ultra-Reliable and Low-Latency Communication UTRAN Universal Mobile Telecommunications System Terrestrial Radio Access Network WLAN Wireless Local Area Network

We claim:

1. A user equipment (UE) configured for New Radio (NR) frequency range two (FR2) operation with a three-by-three planar antenna array operating at twenty-eight gigahertz and without awareness of a direction to any base station, the UE comprising:

at least one processor; and at least one memory storing instructions that, when executed by the at least one processor, cause the UE to:

transmit, in UE capability signaling to a location management function, a capability indicating a maximum antenna delta gain of twenty decibels for phase-center-offset variation assessment;

receive, from the location management function, a probability parameter fixed at 90 percent and a list consisting only of two antenna delta-gain thresholds comprising 20 decibels and 10 decibels;

calculate, for a broad boresight transmit beam used for sounding reference signal for positioning (SRS-P) transmissions and over an entire evaluated radiation sphere down to each of the received two antenna delta-gain thresholds, two timing error-group margins based on locally stored phase-center-offset variation characterization data for the broad boresight transmit beam, wherein a first timing error group is associated with a first margin of the two timing error-group margins of plus or minus 0.1 nanosecond when evaluated at an antenna delta-gain threshold of 20 decibels, and a second timing error group is associated with a second margin of the two timing error-group margins of plus or minus 1 nanosecond when evaluated at an antenna delta-gain threshold of 10 decibels, each of the first and second margins being a worst-case value with a likelihood of at least 90 percent and independent of any reference-direction identifier; and transmit, to the location management function, a timing-error-group report that (i) includes the two antenna delta-gain thresholds, (ii) associates the first timing error group with the first margin of plus or minus 0.1 nanosecond at the antenna delta-gain threshold of 20 decibels and associates the second timing error group with the second margin of plus or minus 1 nanosecond at the antenna delta-gain threshold of 10 decibels, and (iii) expressly declares validity over the entire evaluated radiation sphere without any angular reference window.

2. The UE of claim 1, wherein the at least one memory stores a characterized mapping of phase-center-offset (PCO) variation over the entire evaluated radiation sphere down to a maximum antenna delta-gain threshold of twenty decibels, and wherein the calculating of the two timing error-group margins is based on the characterized mapping.

3. The UE of claim 2, wherein the calculating comprises deriving each timing error-group margin of the two timing error-group margins from a cumulative distribution function of a PCO vector and selecting a percentile corresponding to the received probability parameter of ninety percent, and wherein the timing-error-group report further includes an indication that the first and second margins correspond to the ninety-percent likelihood.

4. The UE of claim 3, wherein the timing-error-group report further includes explicit identifiers for the first and second timing error groups, and the timing-error-group report associates a first identifier with the first margin of plus or minus 0.1 nanosecond at the antenna delta-gain threshold of twenty decibels and a second identifier with the second margin of plus or minus 1 nanosecond at the antenna delta-gain threshold of ten decibels.

5. The UE of claim 4, wherein the timing-error-group report omits any reference-direction identifier and omits any angular validity-region field, and expressly states validity over the entire evaluated radiation sphere.

6. The UE of claim 5, wherein the at least one memory stores PCO-variation characterization used for the calculating, and wherein, responsive to a subsequent request from the location management function identifying a reduced subset of the two antenna delta-gain thresholds, the UE is further configured to transmit a new timing-error-group report computed from the stored characterization without retransmitting any sounding reference signal for positioning.

7. The UE of claim 6, wherein the calculating further comprises computing a mean PCO offset over the entire evaluated radiation sphere and applying a local time-of-departure compensation with respect to the mean PCO offset for the sounding reference signal for positioning transmissions used in deriving the two timing error-group margins.

8. A method performed by a user equipment (UE) configured for New Radio (NR) frequency range two (FR2) operation with a three-by-three planar antenna array operating at twenty-eight gigahertz and without awareness of a direction to any base station, the method comprising:

transmitting, in UE capability signaling to a location management function, a capability indicating a maximum antenna delta gain of twenty decibels for phase-center-offset variation assessment;

receiving, from the location management function, a probability parameter fixed at 90 percent and a list consisting only of two antenna delta-gain thresholds comprising 20 decibels and 10 decibels;

calculating, for a broad boresight transmit beam used for sounding reference signal for positioning (SRS-P) transmissions and over an entire evaluated radiation sphere down to each of the received two antenna delta-gain thresholds, two timing error-group margins based on locally stored phase-center-offset variation characterization data for the broad boresight transmit beam, wherein a first timing error group is associated with a first margin of the two timing error-group margins of plus or minus 0.1 nanosecond when evaluated at an antenna delta-gain threshold of 20 decibels, and a second timing error group is associated with a second margin of the two timing error-group margins of plus or minus 1 nanosecond when evaluated at an antenna delta-gain threshold of 10 decibels, each of the first and second margins being a worst-case value with a likelihood of at least 90 percent and independent of any reference-direction identifier; and transmitting, to the location management function, a timing-error-group report that (i) includes the two antenna delta-gain thresholds, (ii) associates the first timing error group with the first margin of plus or minus 0.1 nanosecond at the antenna delta-gain threshold of 20 decibels and associates the second timing error group with the second margin of plus or minus 1 nanosecond at the antenna delta-gain threshold of 10 decibels, and (iii) expressly declares validity over the entire evaluated radiation sphere without any angular reference window.

9. The method of claim 8, further comprising: storing a characterized mapping of phase-center-offset (PCO) variation over the entire evaluated radiation sphere down to a maximum antenna delta-gain threshold of twenty decibels, and wherein the calculating of the two timing error-group margins is based on the characterized mapping.

10. The method of claim 9, wherein the calculating comprises deriving each timing error-group margin of the two timing error-group margins from a cumulative distribution function of a PCO vector and selecting a percentile corresponding to the received probability parameter of ninety percent, and wherein the timing-error-group report further includes an indication that the first and second margins correspond to the ninety-percent likelihood.

11. The method of claim 10, wherein the timing-error-group report further includes explicit identifiers for the first and second timing error groups, and the timing-error-group report associates a first identifier with the first margin of plus or minus 0.1 nanosecond at the antenna delta-gain threshold of twenty decibels and a second identifier with the second margin of plus or minus 1 nanosecond at the antenna delta-gain threshold of ten decibels.

12. The method of claim 11, wherein the timing-error-group report omits any reference-direction identifier and omits any angular validity-region field, and expressly states validity over the entire evaluated radiation sphere.

13. The method of claim 12, further comprising: storing PCO-variation characterization used for the calculating, and wherein, responsive to a subsequent request from the location management function identifying a reduced subset of the two antenna delta-gain thresholds, the UE is further configured to transmit a new timing-error-group report computed from the stored characterization without retransmitting any sounding reference signal for positioning, and wherein the calculating further comprises computing a mean PCO offset over the entire evaluated radiation sphere and applying a local time-of-departure compensation with respect to the mean PCO offset for the sounding reference signal for positioning transmissions used in deriving the two timing error-group margins.

* * * * *